United States Patent [19]

Brooks

[11] Patent Number: 4,783,667

[45] Date of Patent: Nov. 8, 1988

[54] PRINTING OF ANGLED AND CURVED LINES USING THERMAL DOT MATRIX PRINTER

[75] Inventor: Ralf M. Brooks, Waterloo, Canada

[73] Assignee: NCR Canada LTD - NCR Canada LTEE, Mississauga, Canada

[21] Appl. No.: 74,796

[22] Filed: Jul. 17, 1987

[51] Int. Cl.$^4$ .......................................... G01D 15/10
[52] U.S. Cl. .............................. 346/76 PH; 346/1.1; 219/216
[58] Field of Search ........................ 346/76 PH, 1.1; 219/216 PH; 400/120

[56] References Cited

U.S. PATENT DOCUMENTS

| | | | |
|---|---|---|---|
| 3,934,695 | 1/1976 | Kovalick | 197/1 E |
| 4,140,907 | 2/1979 | Oba | 250/316 |
| 4,284,876 | 8/1981 | Ishibashi et al. | 219/216 |
| 4,321,610 | 3/1982 | Moore et al. | 346/108 |
| 4,347,518 | 8/1982 | Williams et al. | 346/1.1 |
| 4,364,063 | 12/1982 | Anno et al. | 346/76 PH |
| 4,372,696 | 2/1983 | Pou | 400/124 |
| 4,376,942 | 3/1983 | Toth et al. | 346/76 PH |
| 4,394,092 | 7/1983 | Osmera et al. | 400/120 |
| 4,400,791 | 8/1983 | Kitado | 364/900 |
| 4,415,286 | 11/1983 | Jennings | 400/279 |
| 4,453,166 | 6/1984 | Enoto | 346/1.1 |
| 4,459,431 | 7/1984 | Hiroichi et al. | 178/30 |
| 4,500,893 | 2/1985 | Sakura et al. | 346/76 PH |
| 4,508,463 | 4/1985 | Wang et al. | 400/124 |
| 4,531,132 | 7/1985 | Wilkinson | 346/76 PH |
| 4,547,784 | 10/1985 | Erlichman et al. | 346/76 PH |
| 4,558,328 | 12/1985 | Takanashi | 346/76 PH |
| 4,563,693 | 1/1986 | Masaki | 346/76 PH |
| 4,564,847 | 1/1986 | Hayashi et al. | 346/76 PH |
| 4,566,813 | 1/1986 | Kobayashi et al. | 400/120 |
| 4,573,058 | 2/1986 | Brooks et al. | 346/76 PH |
| 4,586,835 | 5/1986 | Alexander et al. | 400/121 |
| 4,587,530 | 5/1986 | Noguchi | 346/76 PH |
| 4,594,501 | 6/1986 | Culley et al. | 219/492 |
| 4,595,935 | 6/1986 | Brooks, et al. | 346/76 PH |
| 4,596,995 | 6/1986 | Yamakawa et al. | 346/160 |
| 4,625,216 | 11/1986 | Brooks et al. | 346/76 PH |
| 4,636,812 | 1/1987 | Bakewell | 346/76 PH |
| 4,652,892 | 3/1987 | Tanaka | 346/76 PH |

FOREIGN PATENT DOCUMENTS 0072224 2/1983 European Pat. Off.

OTHER PUBLICATIONS

IBM Technical Disclosure Bulletin, vol. 23, No. 1, Jun. 1980, "Electrode Checking Circuit", by C. O. Ross.
U.S. patent appln., Ser. No. 561,449, filed Dec. 14, 1983, Ralf M. Brooks et al.
U.S. patent appln., Ser. No. 786,887, filed Oct. 11, 1985, Ralf M. Brooks.
U.S. patent appln., Ser. No. 859,515, filed May 5, 1986, Ralf M. Brooks et al.

*Primary Examiner*—E. A. Goldberg
*Assistant Examiner*—M. M. Lateef
*Attorney, Agent, or Firm*—Wilbert Hawk, Jr.; Albert L. Sessler, Jr.

[57] ABSTRACT

A method and apparatus are described for enhancing the visual quality of dot matrix characters printed by means of thermal printing technologies, particularly in enhancing diagonal lines and blended radii of curvature. Two independent techniques can be combined or used in isolation to effect this print enhancement. The first, quarter dot step resolution, enables printed dots to be positioned at one quarter their previous step displacement distance. Memory must be expanded to handle increased dot position resolution. The second technique is element energy control, which enables each element in the printhead to emit different energy levels. The individual dot energy control translates into control of the printed dot shape and size, which when properly controlled, allows printing of diagonal lines and blended radii of curvature. This second technique further increases the required memory space by an additional factor.

22 Claims, 27 Drawing Sheets

FIG. I
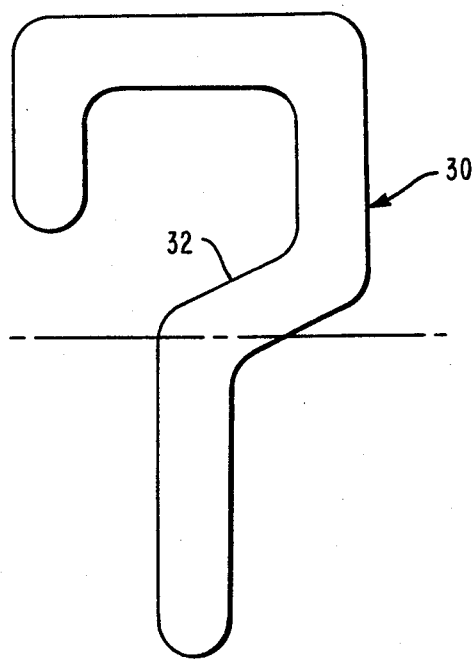
FIG. II
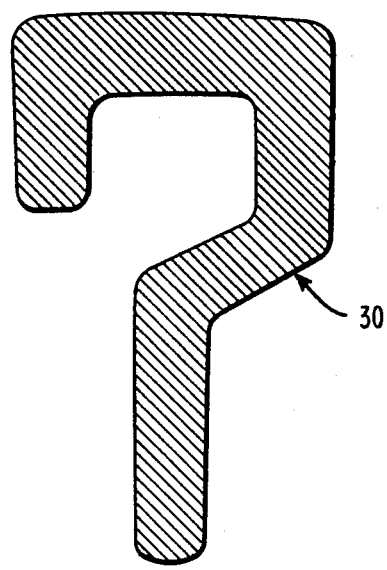

FIG. 2

PRINTED DOT AREA MODULATION AS A FUNCTION OF % OF NOMINAL ENERGY

FIG. 5A

| ROW | VALUE IN MEMORY | BINARY EQUIVALENT |
|---|---|---|
| 18 | 0FFC | 0000 1111 1111 1100 |
| 17 | 0FFC | 0000 1111 1111 1100 |
| 16 | 0C0C | 0000 1100 0000 1100 |
| 15 | 0C0C | |
| 14 | 0C0C | |
| 13 | 0C0C | 0000 1100 0000 1100 |
| 12 | 000C | 0000 0000 0000 1100 |
| 11 | 003C | 0000 0000 0011 1100 |
| 10 | 00F0 | 0000 0000 1111 0000 |
| 9 | 00C0 | 0000 0000 1100 0000 |
| 8 | 00C0 | |
| 7 | 00C0 | |
| 6 | 00C0 | |
| 5 | 00C0 | |
| 4 | 00C0 | |
| 3 | 00C0 | |
| 2 | 00C0 | |
| 1 | 00C0 | 0000 0000 1100 0000 |

FIG. 5B

| ROW | HEX VALUE IN MEMORY | ROW | HEX VALUE IN MEMORY | ROW | HEX VALUE IN MEMORY | ROW | HEX VALUE IN MEMORY |
|---|---|---|---|---|---|---|---|
| 18.3 | 0000 | 14.1 | 0000 | 9.3 | 0020 | 5.1 | 0000 |
| 18.2 | 0000 | 14.0 | 0C0C | 9.2 | 0080 | 5.0 | 0C0 |
| 18.1 | 0000 | 13.3 | 0000 | 9.1 | 0000 | 4.3 | 0000 |
| 18.0 | 0000 | 13.2 | 0000 | 9.0 | 0C0 | 4.2 | 0C0 |
| 17.3 | 0FFC | 13.1 | 0C0C | 8.3 | 0000 | 4.1 | 0000 |
| 17.2 | 0000 | 13.0 | 0000 | 8.2 | 0C0 | 4.0 | 0C0 |
| 17.1 | 0000 | 12.3 | 0000 | 8.1 | 0000 | 3.3 | 0000 |
| 17.0 | 0FFC | 12.2 | 0000 | 8.0 | 0C0 | 3.2 | 0C0 |
| 16.3 | 0000 | 12.1 | 0000 | 7.3 | 0000 | 3.1 | 0000 |
| 16.2 | 0000 | 12.0 | 000C | 7.2 | 0C0 | 3.0 | 0C0 |
| 16.1 | 0000 | 11.3 | 0000 | 7.1 | 0000 | 2.3 | 0000 |
| 16.0 | 0C0C | 11.2 | 0000 | 7.0 | 0C0 | 2.2 | 0C0 |
| 15.3 | 0000 | 11.1 | 000C | 6.3 | 0000 | 2.1 | 0000 |
| 15.2 | 0000 | 11.0 | 0000 | 6.2 | 0C0 | 2.0 | 0C0 |
| 15.1 | 0000 | 10.3 | 0018 | 6.1 | 0000 | 1.3 | 0000 |
| 15.0 | 0C0C | 10.2 | 0020 | 6.0 | 0C0 | 1.2 | 0C0 |
| 14.3 | 0000 | 10.1 | 0010 | 5.3 | 0000 | 1.1 | 0000 |
| 14.2 | 0000 | 10.0 | 0040 | 5.2 | 0000 | 1.0 | 0C0 |

| COLUMN | MEMORY BINARY REPRESENTATION ||||||
|---|---|---|---|---|---|---|
| | BYTE 1 || BYTE 2 || BYTE 3 ||
| | B | A | B | A | B | A |
| 1 | 0000 | 0000 | 0011 | 1111 | 1100 | 0000 |
| 2 | 0000 | 0000 | 0011 | 1111 | 1100 | 0000 |
| 3 | 0000 | 0000 | 0110 | 0000 | 1100 | 0000 |
| 4 | 0000 | 1111 | 0110 | 0000 | 1100 | 0000 |
| 5 | 1111 | 1111 | 1100 | 0000 | 1100 | 0000 |
| 6 | 1111 | 0000 | 0000 | 0000 | 1100 | 0000 |
| 7 | 0000 | 0000 | 0000 | 0000 | 1100 | 0000 |
| 8 | 0000 | 0000 | 0000 | 1111 | 1100 | 0000 |
| 9 | 0000 | 0000 | 0000 | 1111 | 1100 | 0000 |
| 10 | 0000 | 0000 | 0000 | 0000 | 0000 | 0000 |
| 11 | 0000 | 0000 | 0000 | 0000 | 0000 | 0000 |
| 12 | 0000 | 0000 | 0000 | 0000 | 0000 | 0000 |
| 13 | 0000 | 0000 | 0000 | 0000 | 0000 | 0000 |
| 14 | 0000 | 0000 | 0000 | 0000 | 0000 | 0000 |

| MEMORY HEX REPRESENTATION ||||||
|---|---|---|---|---|---|
| BYTE 1 || BYTE 2 || BYTE 3 ||
| B | A | B | A | B | A |
| 0 | 0 | 3 | F | C | 0 |
| 0 | 0 | 3 | F | C | 0 |
| 0 | 0 | 6 | 0 | C | 0 |
| 0 | F | 6 | 0 | C | 0 |
| F | F | C | 0 | C | 0 |
| F | 0 | 0 | 0 | C | 0 |
| 0 | 0 | 0 | 0 | C | 0 |
| 0 | 0 | 0 | F | C | 0 |
| 0 | 0 | 0 | F | C | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

FIG. 14A

| COLUMN | MEMORY BINARY REPRESENTATION ||||||| MEMORY HEX REPRESENTATION ||||||
| | BYTE 1 || BYTE 2 || BYTE 3 || BYTE 1 || BYTE 2 || BYTE 3 ||
| ROW → | B | A | B | A | B | A | B | A | B | A | B | A |
| | 1234 | 5678 | 9--12 | 13--16 | 17--20 | 21--24 | | | | | | |
| 1.0 | 0000 | 0000 | 0001 | 1111 | 1100 | 0000 | 0 | 0 | 1 | F | C | 0 |
| 1.1 | 0000 | 0000 | 0010 | 0000 | 0000 | 0000 | 0 | 0 | 2 | 0 | 0 | 0 |
| 1.2 | 0000 | 0000 | 0000 | 0000 | 0000 | 0000 | 0 | 0 | 0 | 0 | 0 | 0 |
| 1.3 | 0000 | 0000 | 0001 | 1111 | 1100 | 0000 | 0 | 0 | 1 | F | C | 0 |
| 2.0 | 0000 | 0000 | 0010 | 0000 | 0000 | 0000 | 0 | 0 | 2 | 0 | 0 | 0 |
| 2.1 | 0000 | 0000 | 0000 | 0000 | 0000 | 0000 | 0 | 0 | 0 | 0 | 0 | 0 |
| 2.2 | 0000 | 0000 | 0100 | 0000 | 0000 | 0000 | 0 | 0 | 4 | 0 | 0 | 0 |
| 2.3 | 0000 | 0000 | 0010 | 0000 | 0000 | 0000 | 0 | 0 | 2 | 0 | 0 | 0 |
| 3.0 | 0000 | 0000 | 0000 | 0000 | 1100 | 0000 | 0 | 0 | 0 | 0 | C | 0 |
| 3.1 | 0000 | 0000 | 0100 | 0000 | 0000 | 0000 | 0 | 0 | 4 | 0 | 0 | 0 |
| 3.2 | 0000 | 0000 | 0000 | 0000 | 0000 | 0000 | 0 | 0 | 0 | 0 | 0 | 0 |
| 3.3 | 0000 | 0000 | 0100 | 0000 | 0000 | 0000 | 0 | 0 | 4 | 0 | 0 | 0 |
| 4.0 | 0000 | 0000 | 1000 | 0000 | 0000 | 0000 | 0 | 0 | 8 | 0 | 0 | 0 |
| 4.1 | 0000 | 0000 | 0100 | 0000 | 1100 | 0000 | 0 | 0 | 4 | 0 | C | 0 |
| 4.2 | 0000 | 0000 | 0000 | 0000 | 0000 | 0000 | 0 | 0 | 0 | 0 | 0 | 0 |
| 4.3 | 0000 | 0000 | 1000 | 0000 | 1100 | 0000 | 0 | 0 | 8 | 0 | C | 0 |

| ROW COLUMN | \\ BYTE | MEMORY HEX REPRESENTATION | | | | | |
|---|---|---|---|---|---|---|---|
| | | 1  2  3  4 | 5  6  7  8 | 9 -- 12 | 13 -- 16 | 17 -- 20 | 21 -- 24 |
| 1.0 | | 0000 | 0000 | 000A | 8888 | 8800 | 0000 |
| 1.1 | | 0000 | 0000 | 0040 | 0000 | 0000 | 0000 |
| 1.2 | | 0000 | 0000 | 0000 | 0000 | 0000 | 0000 |
| 1.3 | | 0000 | 0000 | 000A | 8888 | 8800 | 0000 |
| 2.0 | | 0000 | 0000 | 00A0 | 0000 | 0000 | 0000 |
| 2.1 | | 0000 | 0000 | 0000 | 0000 | 0000 | 0000 |
| 2.2 | | 0000 | 0000 | 0400 | 0000 | 0000 | 0000 |
| 2.3 | | 0000 | 0000 | 0080 | 0000 | 8800 | 0000 |
| 3.0 | | 0000 | 0000 | 0000 | 0000 | 0000 | 0000 |
| 3.1 | | 0000 | 0000 | 0400 | 0000 | 0000 | 0000 |
| 3.2 | | 0000 | 0000 | 0000 | 0000 | 0000 | 0000 |
| 3.3 | | 0000 | 0000 | 0A00 | 0000 | 8800 | 0000 |
| 4.0 | | 0000 | 0000 | 4000 | 0000 | 0000 | 0000 |
| 4.1 | | 0000 | 0000 | 0600 | 0000 | 0000 | 0000 |
| 4.2 | | 0000 | 0000 | 0000 | 0000 | 0000 | 0000 |
| 4.3 | | 0000 | 0000 | A000 | 0000 | 8800 | 0000 |
| 5.0 | | 8888 | 888A | 0000 | 0000 | 0000 | 0000 |
| 5.1 | | 0000 | 0000 | A000 | 0000 | 0000 | 0000 |
| 5.2 | | 0000 | 0000 | 7000 | 0000 | 0000 | 0000 |
| 5.3 | | 8888 | 888A | 0000 | 0000 | 8800 | 0000 |
| 6.0 | | 0000 | 0000 | 0000 | 0000 | 0000 | 0000 |
| 6.1 | | 0000 | 0000 | 0000 | 0000 | 0000 | 0000 |
| 6.2 | | 0000 | 0000 | 0000 | 0000 | 0000 | 0000 |
| 6.3 | | 0000 | 0000 | 0000 | 0000 | 8800 | 0000 |
| 7.0 | | 0000 | 0000 | 0000 | 0000 | 0000 | 0000 |
| 7.1 | | 0000 | 0000 | 0000 | 0000 | 0000 | 0000 |
| 7.2 | | 0000 | 0000 | 0000 | 0000 | 0000 | 0000 |
| 7.3 | | 0000 | 0000 | 0000 | 0000 | 8800 | 0000 |
| 8.0 | | 0000 | 0000 | 0000 | 0000 | 0000 | 0000 |
| 8.1 | | 0000 | 0000 | 0000 | 0000 | 0000 | 0000 |
| 8.2 | | 0000 | 0000 | 0000 | 0000 | 0000 | 0000 |

| | | | | | | | |
|---|---|---|---|---|---|---|---|
| 8.3 | 0000 | 0000 | 0000 | 0000 | 8800 | 0000 |
| 9.0 | 0000 | 0000 | 0000 | 8888 | 0000 | 0000 |
| 9.1 | 0000 | 0000 | 0000 | 0000 | 0000 | 0000 |
| 9.2 | 0000 | 0000 | 0000 | 0000 | 0000 | 0000 |
| 9.3 | 0000 | 0000 | 0000 | 8888 | 8800 | 0000 |
| 10.0 | 0000 | 0000 | 0000 | 0000 | 0000 | 0000 |
| 10.1 | 0000 | 0000 | 0000 | 0000 | 0000 | 0000 |
| 0.2 | 0000 | 0000 | 0000 | 0000 | 0000 | 0000 |
| 10.3 | 0000 | 0000 | 0000 | 0000 | 0000 | 0000 |
| 11.0 | 0000 | 0000 | 0000 | 0000 | 0000 | 0000 |
| 11.1 | ⋮ | ⋮ | ⋮ | ⋮ | ⋮ | ⋮ |
| 11.2 | ⋮ | ⋮ | ⋮ | ⋮ | ⋮ | ⋮ |
| 11.3 | 0000 | 0000 | 0000 | 0000 | 0000 | 0000 |
| 12.0 | 0000 | 0000 | 0000 | 0000 | 0000 | 0000 |
| 12.1 | ⋮ | ⋮ | ⋮ | ⋮ | ⋮ | ⋮ |
| 12.2 | ⋮ | ⋮ | ⋮ | ⋮ | ⋮ | ⋮ |
| 12.3 | 0000 | 0000 | 0000 | 0000 | 0000 | 0000 |
| 13.0 | 0000 | 0000 | 0000 | 0000 | 0000 | 0000 |
| 13.1 | ⋮ | ⋮ | ⋮ | ⋮ | ⋮ | ⋮ |
| 13.2 | ⋮ | ⋮ | ⋮ | ⋮ | ⋮ | ⋮ |
| 13.3 | 0000 | 0000 | 0000 | 0000 | 0000 | 0000 |
| 14.0 | 0000 | 0000 | 0000 | 0000 | 0000 | 0000 |
| 14.1 | ⋮ | ⋮ | ⋮ | ⋮ | ⋮ | ⋮ |
| 14.2 | ⋮ | ⋮ | ⋮ | ⋮ | ⋮ | ⋮ |
| 14.3 | 0000 | 0000 | 0000 | 0000 | 0000 | 0000 |

| % OF NOMINAL ENERGY | | BINARY REPRESENTATION | MEMORY HEX REPRESENTATION |
|---|---|---|---|
| 135 | (1.89 mJ) | 1111 | F |
| 130 | (1.82 mJ) | 1110 | E |
| 125 | (1.25 mJ) | 1101 | D |
| 120 | (1.68 mJ) | 1100 | C |
| 115 | (1.61 mJ) | 1011 | B |
| 110 | (1.54 mJ) | 1010 | A |
| 105 | (1.47 mJ) | 1001 | 9 |
| 100 | (1.40 mJ) | 1000 | 8 |
| 95 | (1.33 mJ) | 0111 | 7 |
| 90 | (1.26 mJ) | 0110 | 6 |
| 85 | (1.19 mJ) | 0101 | 5 |
| 80 | (1.12 mJ) | 0100 | 4 |
| 75 | (1.05 mJ) | 0011 | 3 |
| 70 | (0.98 mJ) | 0010 | 2 |
| 65 | (0.91 mJ) | 0001 | 1 |
| * OFF | 0 mJ | 0000 | 0 |

\* ELEMENT NOT USED

FIG. 21

RAM MEMORY

| MEMORY ADDRESS LOCATION (HEX) | CONTENTS |
|---|---|
| 00 – 0F | GENERAL SCRATCHPAD |
| 10 | MAX BURN COUNT REGISTER |
| 11 | $V_{HEAD}/V_{HEAD}^2$ |
| 12 | VSAT Q1 |
| 13 | $V_{R\,NOMINAL}$ / CURRENT CORRECTION |

TPH RESISTANCE READINGS
| 14 – 1F | R3 – R14 / T3 – T14 / N3 – N14 |
| 20 – 2B | R15 – R26 / T15 – T26 / N15 – N26 |

TPH BIT MATRIX
| 2C – 2E | TPH CONTENTS FOR BASIS TIME dt1 (3 BYTES = 24 BITS) |
| 2F – 31 | TPH CONTENTS FOR BASIS TIME dt2 " |
| 32 – 34 | TPH CONTENTS FOR BASIS TIME dt3 " |
| • • • | • • • |
| A2 – A4 | TPH CONTENTS FOR BASIS TIME dt40 " |

NOTE: EACH ADDRESS ADDRESSES ONE BYTE

FIG. 22

ROM MEMORY

| MEMORY ADDRESS LOCATION (HEX) | CONTENTS |
|---|---|
| 0000 - 0FFF | PROGRAM MEMORY |
| 1000 - 100F | ENERGY LOOKUP TABLE |
| 1010 - 5990 | CHARACTER (ENERGY) BYTE MAPS |

IE:

24 BYTES/COLUMN * 64 COLUMNS/CHARACTER * 14 CHARACTERS/FONT = 4980 HEX BYTES

PRINTING OF ANGLED AND CURVED LINES USING THERMAL DOT MATRIX PRINTER

BACKGROUND OF THE INVENTION

Non-impact printing, and particularly thermal printing, provides advantages in some applications where lack of noise and/or freedom from vibration are important considerations. In certain applications, such as thermal printing of magnetic ink characters, it is particularly important to reproduce accurately and precisely non-horizontal or non-vertical lines, such as angled and curved lines.

For a financial font, such as E13B, for example, horizontal and vertical character bar segments can be printed within appropriate tolerances and parameters, such as a character pitch of eight characters per inch, with each character being formed by a matrix of fourteen dots horizontally and eighteen dots vertically. There are an additional five dots in the horizontal gap between characters.

Typically, the dot matrix character is formed by sequentially moving the thermal printhead past a stationary thermal transfer ribbon, which may be one containing magnetic ink, and a stationary document, while energizing selected thermal printhead resistive elements to effect ink transfer from ribbon to document one character row or column at a time. Thus for a parallel printer, the thermal printhead would be sequentially stepped to eighteen distinct locations and at each location a row of the dot matrix image would be printed. For a serial printer, printing a twelve character amount field, the thermal printhead would be sequentially stepped to nineteen (fourteen character positions plus five between-character spaces) times twelve equals 228 distinct locations, and at each location, a column of up to eighteen dots comprising the image would be printed.

It should be noted that although the foregoing has described an implementation in which the thermal printhead moves, an alternative embodiment, in which the thermal printhead is stationary and the transfer ribbon and paper move, is also viable. This, however, is not a preferred embodiment since it is easier to ensure precise repeatable movements of the thermal printhead, than to rely upon the paper position variations, due to build-up of debris on the paper roller or platen.

For the fourteen by eighteen dot matrix character under consideration, the resolution in the horizontal and vertical directions is set to 0.0065 inches, or one half the minimum character bar thickness. For a font such as E13B, one could obviously improve the printed resolution by increasing the dot density of the thermal printhead. However, this has the practical drawback of increasing the cost of the printhead and the printer, such that the product would no longer be viable in the marketplace. Since the positions of the dots making up the character are fixed, the design of the character is limited by the spacing between dot centers.

It can accordingly be seen that although straight lines may be achieved in the horizontal and vertical directions, it is impossible, with realistic thermal printhead dot density, to achieve an absolutely straight angular line.

Consequently, with prior techniques, the quality of printing of angular lines has not been altogether satisfactory with practical, cost-effective dot matrix thermal technology. As mentioned previously, this is true because of the tradeoff necessary between the expense associated with the dot density of the thermal printhead and the overall speed of the printer, on the one hand, and the desirability for good quality angular lines on the other.

SUMMARY OF THE INVENTION

The present invention relates to method and apparatus for enhancing the quality of character patterns in dot matrix thermal transfer printers without the necessity of increasing the dot density of the thermal printhead. In particular, the present invention provides method and apparatus for enhancing angular lines and characters printed by dot matrix thermal transfer printers, and concerns the addition of character bit map ROM memory to allow higher resolution control of the thermal printhead as it is stepped across the paper and associated ribbon. The additional character memory matrix contains character data concerning the placement of dots at quarter dot spacing for enhancement of angular lines in the character. The additional character memory matrix also contains information concerning the energy required to be emitted by the printhead element to formulate a specific dot shape unique to that position within the angular line being printed. In accordance with the present invention, reference character bit maps stored in ROM memory are tailored to contain values for detailed energy levels for each constituent dot of the character "bit" map. These energy level bit maps in fact represent different printed dot sizes and along with a quarter dot step capability allow the printing of angular lines and blended radii of curvature. The resistance of each element in the thermal printhead is dynamically determined and a specific burn time for each element within the printhead is thus determined. This unique burn time for each element within the printhead is realized by repeated updates to an associated thermal printhead shift register.

In accordance with one embodiment of the present invention, a method for thermal printing of characters having diagonal or curved portions comprises the following steps: stepping a thermal printhead having a plurality of individual printhead elements with respect to a record member to be printed upon, taking incremental overlapping steps which are in length a fraction of the length of the printhead elements to minimize voids and staircase corners which would otherwise occur when a diagonal or curved line is printed with said print elements; and applying varying amounts of energy to each print element as appropriate during each incremental overlapping step to enlarge or reduce the area of the element impression on the record member to further aid in minimizing the occurrence of voids and staircase corners during printing of a diagonal or curved line.

In accordance with a second embodiment of the invention, apparatus for printing characters having diagonal or curved portions on a record medium comprises: a thermal printhead having a plurality of thermal printing character elements; means for selecting print elements for printing portions of a character on a step-by-step basis, each selected print element being selected for repeated printing with a minimum overlap to form horizontal and vertical character lines and being selected to minimize the printing of voids and corners when printing a diagonal or curved line; means for providing relative incremental step movements between the printhead and the record medium; means for selecting an energy level for each energization of a print element to selectively enlarge or reduce the area of the element impression so as to further minimize the printing of voids and corners when printing a diagonal or curved line; means for storing a digital value for each print element during each step, representing whether or not said element is to be energized, and if so, the amount of such energization, based upon the print selection and energy level selection; and means for retrieving said digital values during a printing operation and controlling said selecting means in accordance with said digital values to control the energization of said print elements.

It is accordingly an object of the present invention to provide a method and apparatus for enhancing character images printed by thermal dot techniques.

Another object of the present invention is to provide a method and apparatus for fractional step printing of characters for enhancement of angular lines and characters printed by thermal dot techniques.

Yet another object of the present invention is to provide a method and apparatus for controlling the size of the printed dot by controlling the emitted energy from individual printhead elements to allow enhancement of angular lines in characters printed by thermal dot techniques.

Yet another object of the present invention is to provide a thermal printing apparatus with quarter dot step control and printhead element size control through an additional character bit map ROM and RAM memory.

With these and other objects, which will become apparent from the following description, in view, the invention includes certain novel features of construction and combinations of parts, a preferred form or embodiment of which is hereinafter described with reference to the drawings which accompany and form a part of this specification.

BRIEF DESCRIPTION OF THE DRAWINGS

FIG. 1 is a "full-faced" or standard representation of the E13B character number seven.

FIG. 2 is a diagram showing a fourteen by eighteen dot matrix representation of the E13B character number seven, where each of the basis dots in 0.0065 in. by 0.0065 in. in dimensions.

FIG. 5A is a chart showing ROM memory contents for a sixteen by eighteen bit E13B character number seven for a parallel thermal printhead printer.

FIG. 5B is a chart showing ROM memory contents for an E13B character number seven using quarter dot step resolution for a parallel thermal printhead printer.

FIG. 11 is a diagram of the E13B character number seven generally representing the result of a combination of quarter dot stepping and element energy control in the printing of diagonal lines.

FIG. 12 is a diagram illustrating the manner in which the bit map data is derived for the E13B character number seven for the serial thermal printhead.

FIG. 13A is a chart showing the ROM memory configuration of the fourteen by eighteen bit E13B character number seven for the serial thermal printhead.

FIGS. 14A, 14B and 14C, taken together, constitute a chart illustrating the ROM memory configuration of the E13B character number seven for the serial thermal printhead when quarter dot stepping is employed.

FIGS. 15A and 15B, taken together, constitute a chart illustrating the ROM memory configuration of the E13B character number seven for the serial thermal printhead when a combination of quarter dot stepping and element energy control is used.

FIG. 16 is a chart illustrating the ROM lookup table relating element energy to its corresponding memory hexadecimal representation.

FIG. 19 is a map showing the manner in which FIGS. 18A, 18B and 18C are related.

FIG. 21 is a chart illustrating the RAM memory contents for the serial thermal printhead operation.

FIG. 22 is a chart illustrating the ROM memory contents for the serial thermal printhead operation.

DETAILED DESCRIPTION OF THE INVENTION

Figure 3:
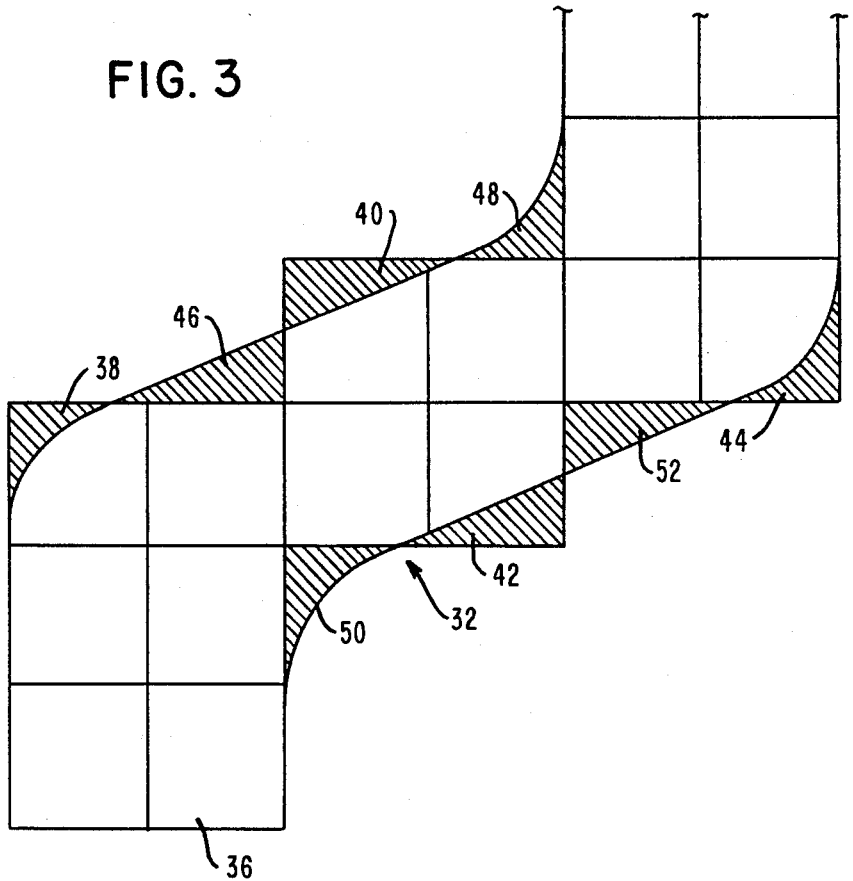
FIG. 3 is a enlargement of the diagonal crossbar portion of the E13B character number seven. Both the ideal diagonal crossbar and the 0.0065 in. by 0.0065 in. dot matrix representation are shown.

Referring now to the drawings, FIG. 1 illustrates a "full-faced" representation 30 of character number seven of the E13B font, as produced by a typewheel/hammer impact printing approach. If a dot matrix representation for this character is adopted, it is imperative that the diagonal crossbar 32 of the character seven represents FIG. 1 as closely as possible in order to meet the stringent visual requirements of the font.

Figure 2:
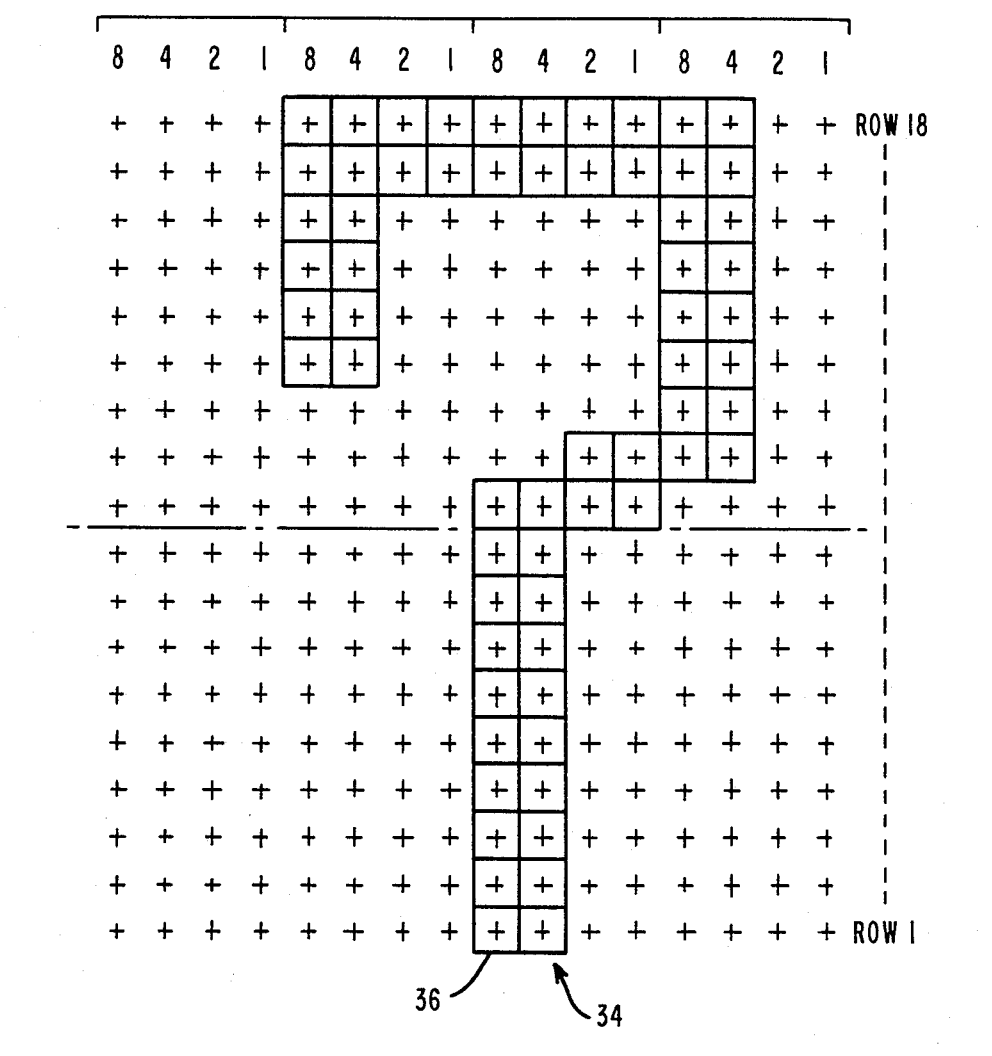

FIG. 2 illustrates a fourteen dot horizontal by eighteen dot vertical matrix representation 34 of the E13B character seven in which each dot or elemental area 36 is 0.0065 inches by 0.0065 inches. This character, and others in the E13B character set, could be printed by a thermal printhead with an element dot density of 153.85 dots/inch and an incremental positioning system which allows a basis movement of 0.0065 inches between dots. The appearance of the character could obviously be improved by using a thermal printhead with higher dot density; however, the cost of the unit then becomes unacceptable for commercial purposes.

FIG. 3 is an enlargement of the dot matrix representation of the diagonal crossbar region 32 of the E13B number 7. Superimposed over the dot element 36 matrix representation is the full-faced outline as per FIG. 1. It will be seen that the regions 38, 40, 42 and 44 exceed the desired diagonal line and regions 46, 48, 50 and 52 fall short of the desired line. As evidenced by FIG. 3, a "staircase" representation of the diagonal crossbar of the number 7 results. This staircase representation unfortunately is quite noticeable to the naked eye, since the eye is an order of magnitude more sensitive to sharp, contrasted edges such as are produced by thermal transfer than it is to fuzzy, mottled edges as are produced by impact printing techniques. The outcome of the above is that this staircase representation for the diagonal lines found in the E13B character 7 is not acceptable.

FIGS. 2 and 3 are simplified dot matrix representations of the E13B character 7. The actual appearance will be further degraded by a number of factors, including the following: first, the actual thermal printhead dot will not be square in shape with 0.0065 inches by 0.0065 inch area and zero spacing between adjacent dots, but rather for technological reasons, will be rectangular in shape and will be 0.0055 inches by 0.0071 inches in area with a 0.001 inch inter-dot space; second, the resistances of the various elements within the thermal printhead will be different and will be dynamically changing throughout the life of the head, being primarily dependent upon particular element usage. As a result, the energy emitted from each dot will be different, which will result in a variable, uncontrolled dot size.

The present invention provides an apparatus and a method such that the comparatively inexpensive 153.85 dots/inch thermal printhead can be used to print diagonal lines and blended radii of curvature without discernible "staircase steps"; that is, to provide dot matrix printing technology which produces printed characters which appear "full face" in structure.

This is accomplished by two independent techniques which may be used in isolation or in combination. The first technique, quarter step dot resolution, involves modifying the base line hardware which produces the character of FIG. 2 to allow the incremental positioning system the capability of moving or stepping at one fourth the previous step displacement or 0.0065/4=0.001625 inch/step. For the parallel printer case, this results in increasing the number of viable start print positions for the printed dot from 18 to 72 in the vertical direction. In addition to the modification of the incremental motion system hardware, the character bit map ROM memory must be increased in size to accommodate the finer detail character resolution. It will be apparent that other incremental stepping arrangements, such as one-third dot stepping, or half dot stepping, could be employed, if desired, for appropriate applications.

The second technique, element dot size control, involves precise control of the energy emitted by each and every element within the thermal printhead such that the printed dot size or shape may be modulated or controlled to allow the realization of diagonal lines and blended radii of curvatures. This second technique requires additional hardware to allow dynamic measurement of the thermal printhead element resistances, hardware to allow rapid update of the shift registers associated with the thermal printhead elements, and additional ROM and RAM memory to define the size of dot required for each dot position within the character dot matrix.

Figure 4:
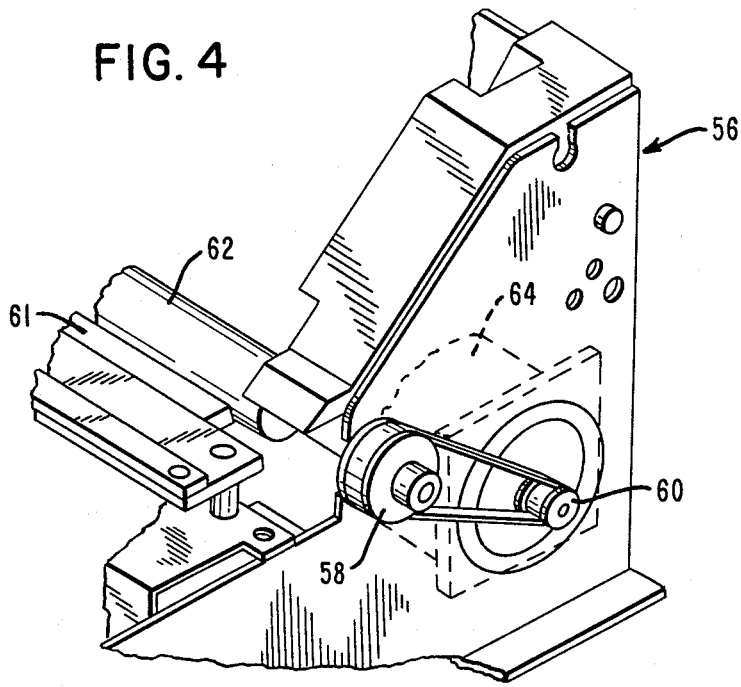
FIG. 4 is a partial view of a thermal printer mechanism.

FIG. 4 illustrates a partial view of a parallel thermal printer mechanism 56. Such a parallel thermal printer may typically have a thermal printhead 61 which includes 320 elements in a single line, which provides the capability for printing up to sixteen characters extending across a field. The printhead is stepped vertically, as the characters are formed, row by row, to complete simultaneous printing of a line of characters. To achieve quarter dot step resolution, the gear ratio between the large drive pulley 58 and the small drive pulley 60 has to be increased by a factor of 4 such that the platen 62 advances 0.0065/4 for each step of the motor 64; or the step angle has to be decreased such that incremental step distance is 0.0065/4; or a combination of the above (the motor step angle and gear ratio) must be provided such that the resultant step movement is 0.0065/4 inches. To take advantage of the increased number of "start" positions for the printed dot, ROM memory must be expanded to contain the high resolution bit maps.

FIG. 5A illustrates the ROM memory contents for representing the base line fourteen dot horizontal by eighteen dot vertical representation of the character 7 shown in FIG. 2 for a parallel thermal printhead (TPH). The hexadecimal number system is used here. Note that to simplify matters, each character dot row is represented by two 8-bit bytes. That is, two extra bits (representing two of the five inter-character blank bits) have been added onto the right side of the character. Referring then to FIG. 2, we see, for example, that the bottom row, Row 1, only has two printed dots whose position correspond to 0000 0000 1100 0000 in the binary system or 00C0 in the hexadecimal numbering system. FIG. 5A completes the bit map for the sixteen (using two 8-bit bytes for each character row) by eighteen dot E13B number 7.

Figure 6:
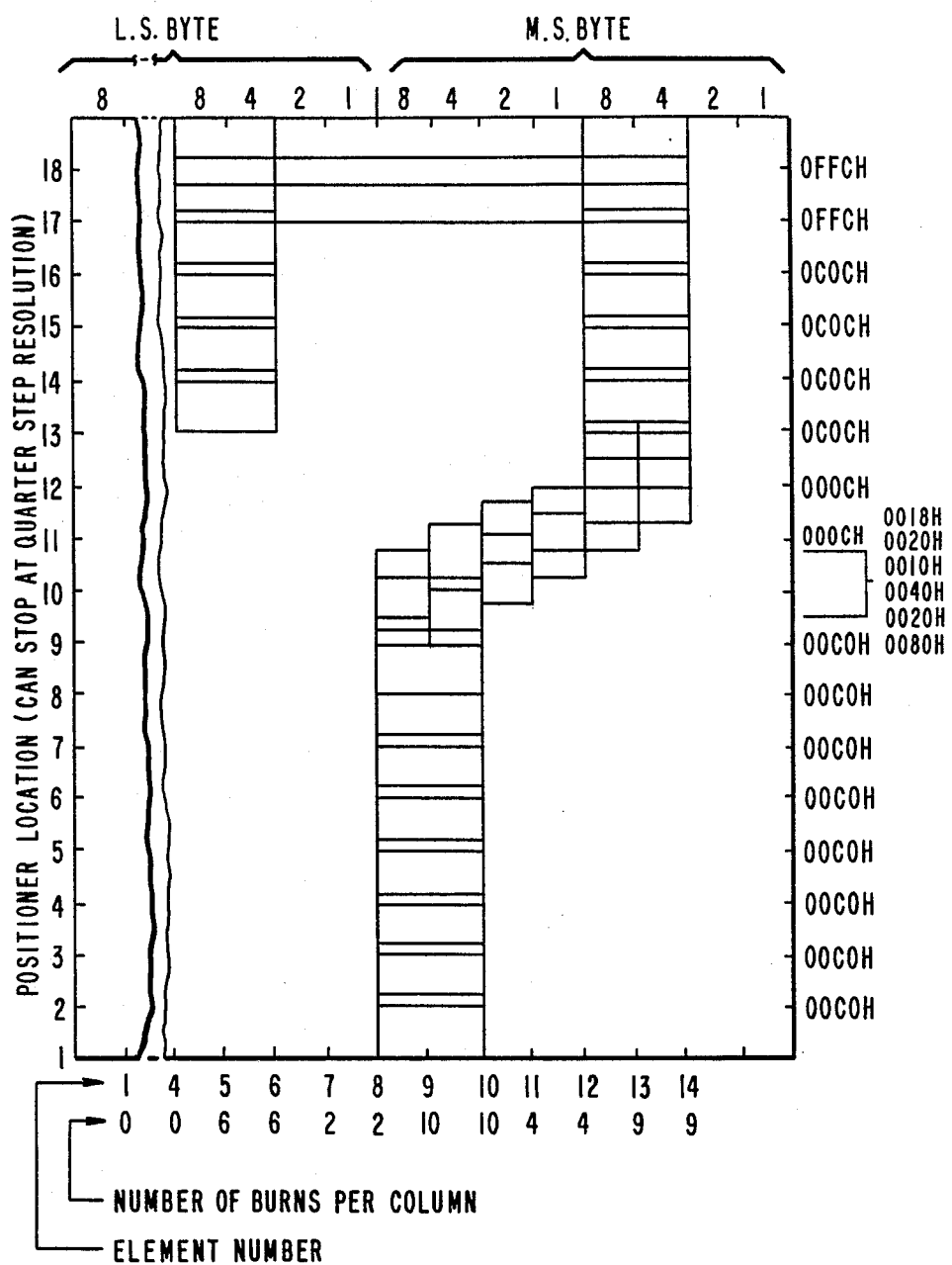
FIG. 6 is a diagram showing an E13B character number seven printed by a parallel thermal printhead using quarter dot step resolution.

FIG. 5B illustrates the ROM memory contents for representing the "high resolution" E13B character 7 shown in FIG. 6 for a parallel thermal printhead when quarter dot step resolution is employed. Note that FIG. 5B resembles FIG. 5A except for the area around the crossbar. The final row burn occurs at row 17.3 rather than row 18 in order to accommodate the "real life" 0.0071 inch high element and to permit compliance with character and bar height constraints.

FIG. 6 illustrates the ideal appearance of the E13B number 7 when quarter dot step spacing is used. Note that the "real life" dot shape of 0.0055 inch×0.0071 inch is used so some dot overlap is visible. It might initially appear that the quarter dot step spacing technique might require a longer printing period, since the required memory has been quadrupled. However, in practice, equivalent or faster printing times can be realized since one can burn "on the fly" and can experimentally determine where the burn should start to comply with character bar width specifications.

When a parallel printer is used to print the E13B number 7 of FIG. 1 (that is, printing is performed from the bottom to the top of the character), the angle of the diagonal crossbar is approximately 35° and a "full faced" appearance can be derived by the quarter dot stepping technique discussed previously. However, when a serial printer is utilized (that is, the E13B number 7 of FIG. 1 is printed from right to left), the angle of the diagonal crossbar becomes approximately 65° and a full-faced appearance for the diagonal is harder to achieve, even with the quarter dot stepping technique.

Obviously, a better full-faced appearance representation of the 65° diagonal line could be obtained with a higher density, more costly thermal printhead. The objective, however, is to make use of the inexpensive, lower dot density printheads to print even these steep diagonal lines. For the general case, irrespective of element dot density, it has been determined that the quarter dot stepping technique works satisfactorily for diagonals at angles $\theta$ where:

$$\theta \leq \tan^{-1}(0.5\ H/W)$$

where
 $\theta$ = angle of the diagonal line with reference to the TPH element line
 H = height of the TPH element
 W = width of the TPH element For angles greater than this value of $\tan^{-1}(0.5\ H/W)$ a staircase appearance still is evident for the dot matrix diagonal representation and other techniques must be devised.

Figure 7A:
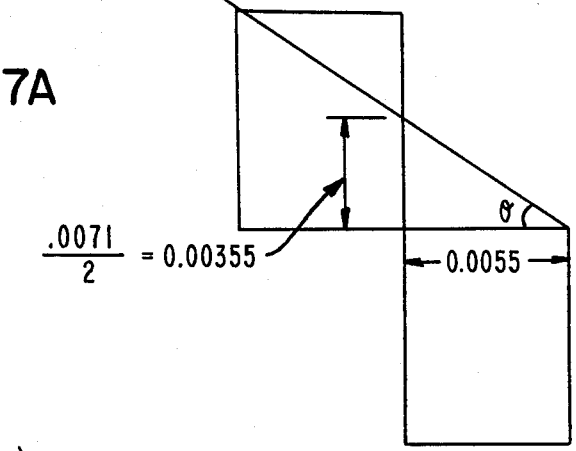
FIG. 7A is a diagram illustrating the diagonal line angle which can be accommodated with quarter dot stepping.

FIG. 7A illustrates the situation for the illustrative example of the 0.0055 inch by 0.0071 inch nominal energy dot size. It is seen that for diagonals at an angle $\theta$ less than or equal to 33°, as obtained with E13B using a parallel thermal printhead, the quarter dot step technique is satisfactory. Obviously, there will not be a sharp transition in print quality at 33° but rather the print quality will deteriorate in a gradual fashion as the angle increases.

Figure 7B:
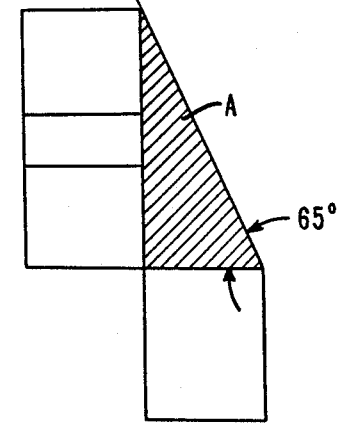
FIG. 7B is a diagram illustrating the area void left over if quarter dot step printing is used to print steep diagonal lines.

For the case of the serial printer approach, the diagonal crossbar of the number 7 would appear at 65° as illustrated in FIG. 7B. The problem to be solved is to fill the void left between the diagonal and the side wall of the closest dot; in FIG. 7B, this is shown as area "A."

Figure 8B:
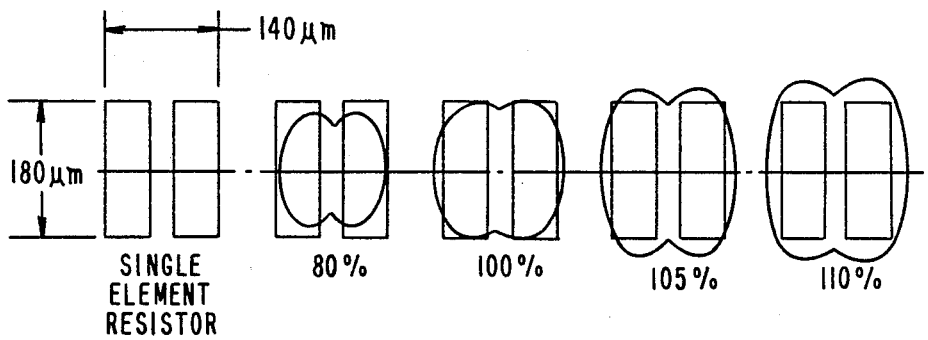
FIG. 8B is a diagram illustrating the actual printed dot appearance plotted versus the percentage of nominal element energy.
Figure 8A:
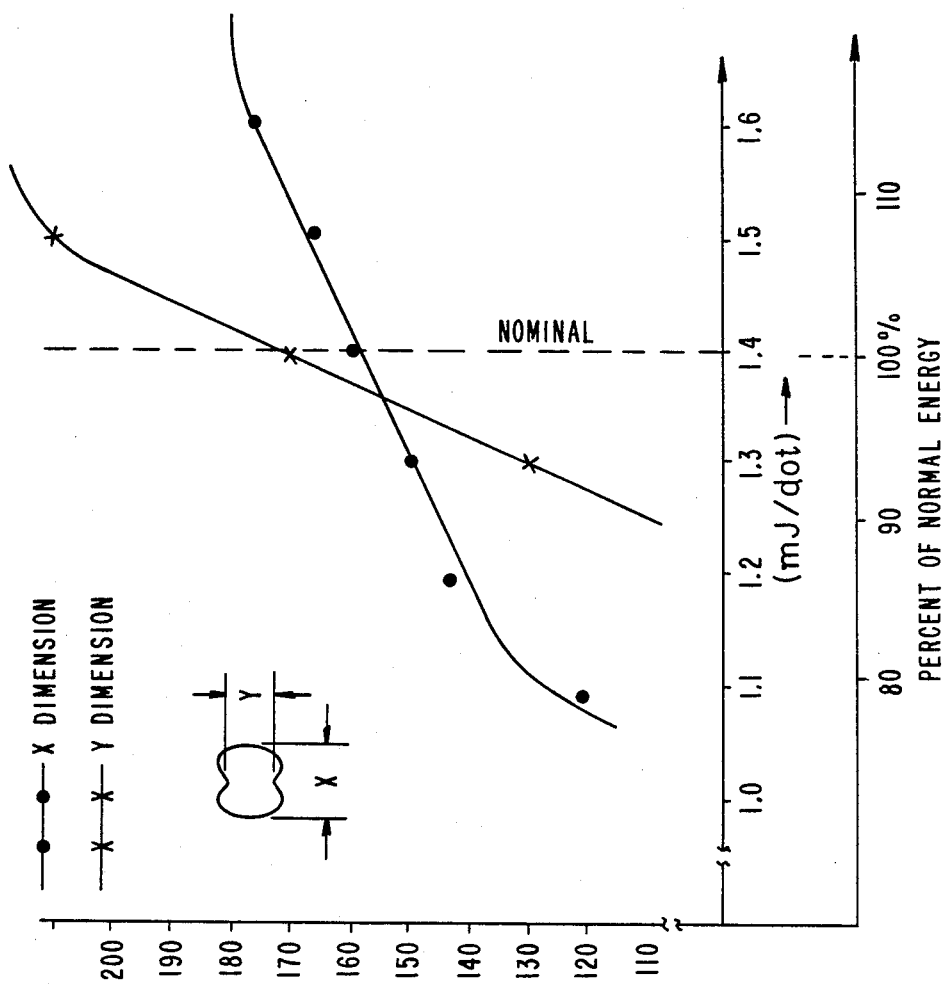
FIG. 8A is a diagram illustrating an experimental derived plot showing dot dimension length versus element print energy.

FIG. 8A illustrates an experimentally derived plot of length of printed (dot) dimension vs. the (input) print energy for both the 'x' and 'y' dimensions of the dot. A plot such as this is dependent on the efficiency of the TPH and such thermal transfer ribbon characteristics as melting point, ink coating weight and ink viscosity. Different ribbon parameters would result in different plot slopes. Also included in FIG. 8A is an additional horizontal axis showing the % of nominal energy, with an element energy of 1.4 mJ/dot being the nominal energy. Note that the rate of change of the y direction of the dot is greater than that of the x direction; this is due to the effect of structural boundary conditions on the element's temperature profile.

FIG. 8B shows the actual size of the printed dot (superimposed on the thermal printhead element outline) as a function of % of nominal (input) energy. The point to be made here is that if the input energy to the thermal printhead element can be controlled, the size of the printed dot can be controlled. By varying the energy, the size of the printed dot can be controllably modulated.

One of the problems with thermal printhead to date is that they are essentially open loop devices. That is, a common voltage and common duration burn time have been utilized for all elements. Since the element resistances have been spread over a wide range from beginning of use (that is, adjacent elements have different values) and have uniquely changed during the course of use, the output energy and hence printed dot areas have remained essentially uncontrolled and different from element to element.

U.S. Pat. No. 4,573,058, assigned to the assignee of the present application, describes apparatus and method for dynamically measuring the resistance of each element within a thermal printhead.

Figure 9A:
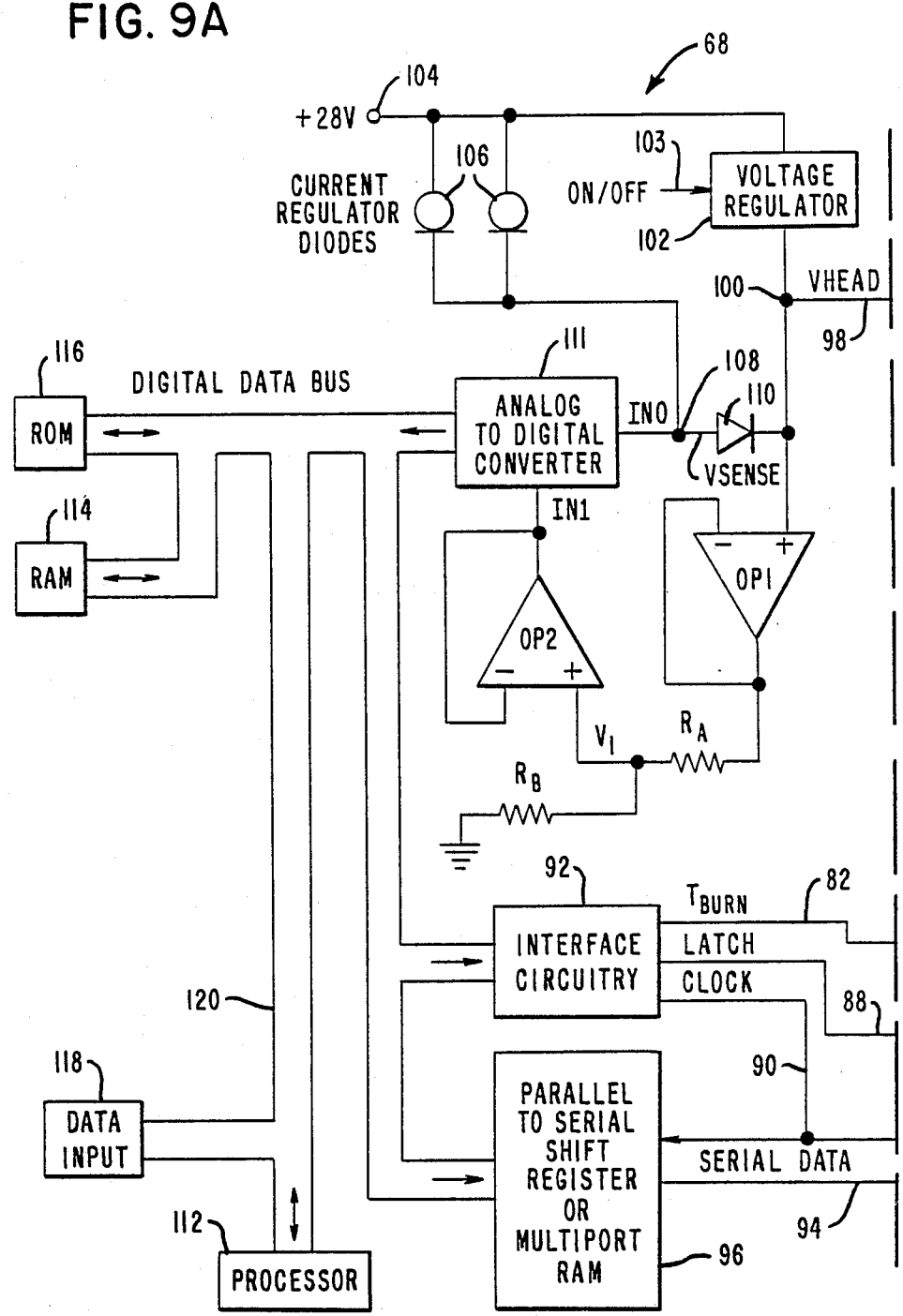
FIGS. 9A and 9B, taken together, constitute a block diagram view of the electronic control circuit of the present invention.
Figure 9B:
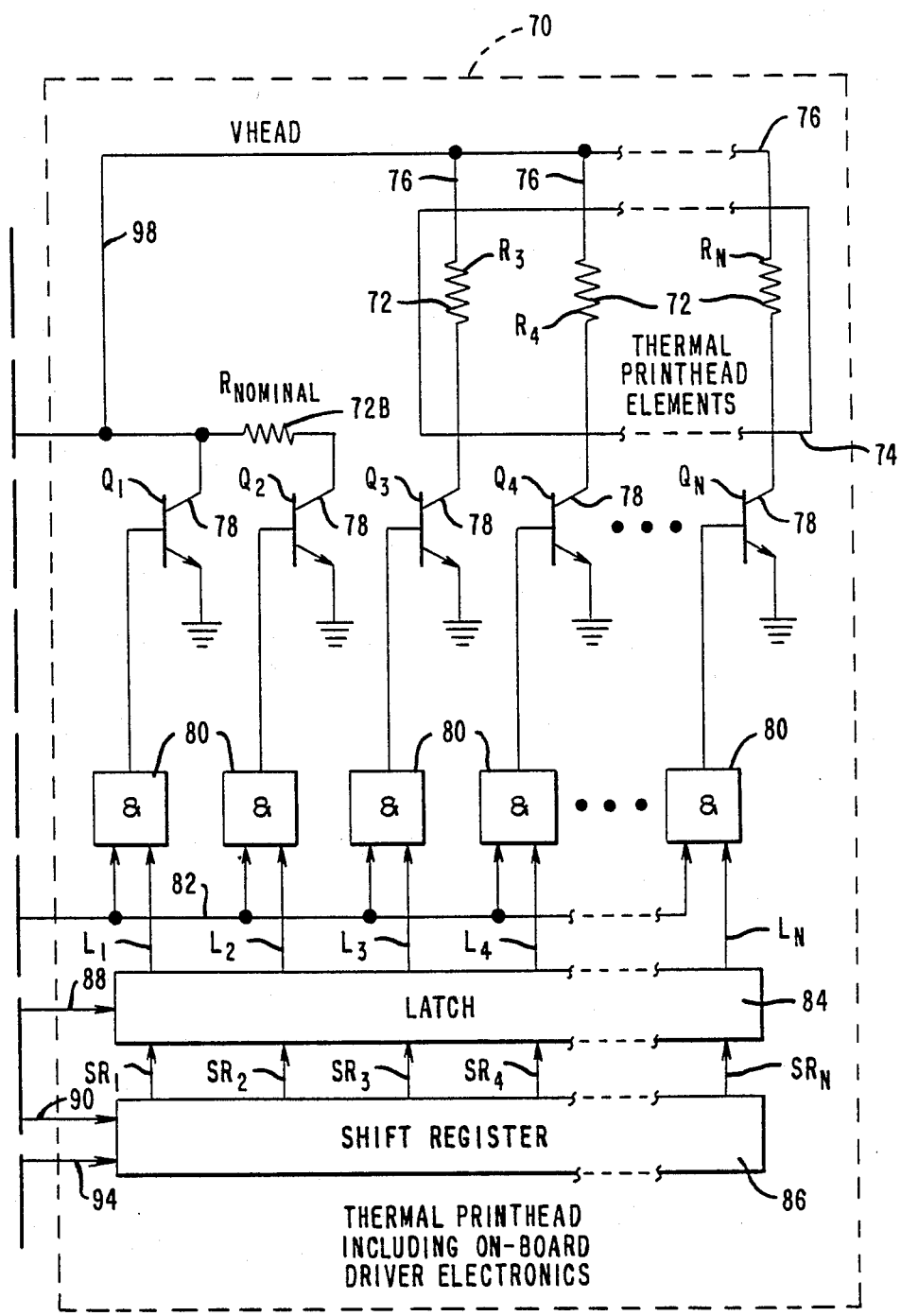

U.S. patent application, Ser. No. 859,515, now U.S. Pat. No. 4,758,966, issued July 19, 1988, also assigned to the assignee of the present application, describes an apparatus and a method for customizing the burn time for each printhead element so that simultaneous specific energies can be derived for each element within the printhead. FIGS. 9A and 9B show the basic circuit configuration used in application Ser. No. 859,515, to which reference may be had for more detailed explanation.

Shown in FIGS. 9A and 9B is a block diagram of a system 68 which comprises an illustrative embodiment of the present invention. A thermal printhead, represented by the dashed-line block 70, includes a plurality of resistive thermal elements 72, also designated $R_3-R_N$ in FIG. 9B, which are deposited or otherwise placed in line upon a ceramic or other substrate, represented by the block 74. Each element 72 is coupled at a first end to a conductor 76, and at its other end is coupled to the collector of a transistor 78, also designated $Q_1-Q_N$, the emitter of which is grounded, and the base of which is coupled to the output of an AND gate 80. These transistors $Q_1-Q_N$ are selectively turned on by high or 1 state signals applied to their bases in order to ground preselected ones of the lower terminals of associated ones of the elements $R_3-R_N$ in FIG. 9B to print thermally a line of information. Each of the transistors $Q_1-Q_N$ that is turned on allows current to flow through its associated one of the thermal resistive elements $R_3-R_N$ in FIG. 9B, for the length of time that the high or one state remains at the transistor base. The resulting energy causes heat transfer to either a donor thermal transfer ribbon (not shown) to effect ink transfer to plain paper or causes a recipient thermal paper (not shown), when used, to develop.

A first input of the AND gate 80 is coupled to a TBURN line 82, and a second input of said AND gate 80 is coupled to one stage of a latch 84. Each stage of the latch 84 is, in turn, coupled to a corresponding stage of a shift register 86. A LATCH line 88 is applied to the latch 84, and a CLOCK line 90 is applied to the shift register 86. Signals on these lines are provided by interface circuitry 92, which will subsequently be described in greater detail. In addition, a SERIAL DATA line 94 is also applied to the shift register 86 from a parallel-to-serial shift register 96, to shift a stream of serial data of N (binary) bits in length into said register, as will subsequently be described in greater detail.

One end of each element 72 is coupled by the conductor 76 to a VHEAD line 98, which is coupled through a node 100, to a voltage regulator 102, which can be switched on or off by a signal from a processor 112 applied to an ON-OFF line 103. From the voltage regulator 102, a path extends to a V+ terminal 104 to which a suitable source of potential is applied. A second circuit path extends from the V+ terminal 104 through a pair of current regulating diodes 106, a node 108 and a diode 110, which may be a germanium diode, to the node 100.

The diodes 106 may be 1N5314 field effect current regulator diodes manufactured by Motorola, Inc., Phoenix, Az., with each diode regulating a nominal constant current of 5 milliamperes, so that the combination can regulate a total constant current of 10 ma. The node 108 is also connected to the input IN0 of an analog-to-digital converter 111, as will subsequently be discussed in greater detail.

In addition to the above, in FIG. 9A, the node 100 is connected to the plus input of operational amplifier OP1 configured in a unity gain voltage follower configuration to provide effective isolation between the voltage regulator 102 output and the resistor network which is connected to the output of amplifier OP1. The output of amplifier OP1 is connected to one lead of a precision resistor $R_A$. The other lead of $R_A$ is connected to one lead of precision resistor $R_B$ and also to the plus input of operational amplifier OP2 configured in a unity gain voltage follower configuration to allow isolation between the resistor network and input IN1 of the analog-to-digital converter 111. The output of amplifier OP2 also applies a low input impedance to the analog-to-digital converter 111. The other lead of resistor $R_B$ is grounded. The purpose of the precision resistor network is to attenuate the voltage VHEAD from the voltage regulator 102 by a precise factor $R_B/R_A+R_B$ such that the subsequent voltage level, $V_1$, is compatible with the maximum allowed voltage input of the analog-to-digital converter 111.

Operational amplifiers OP1 and OP2 may be precision low offset output voltage devices such as the LT1013 as made by Linear Technology Corp., of Milpitas, Calif.

Resistors $R_A$ and $R_B$ may be precision plus or minus 0.1% devices of value 10K ohms and 5K ohms respectively.

The portions of the circuits of FIGS. 9A and 9B described above have the capability of automatically measuring the absolute value of all of the resistive elements 72 contained within the thermal printhead 70. This is accomplished as follows. Initially the processor 112 applies an OFF signal to ON/OFF line 103 to turn off the voltage regulator 102, thus preventing the voltage regulator 102 from applying a +17.6V regulated voltage to the VHEAD line 98 and to the thermal printhead resistive elements $R_3$-$R_N$ in FIG. 9B. The turning off of the voltage regulator 102 forward biases the diode 110, which has its cathode coupled to the VHEAD line 98 and its anode coupled through the two parallel-connected field effect current regulator diodes 106 to a +28V potential.

With diode 110 forward biased, the 10 ma of constant current from current regulator diodes 106 flows through the diode 110 and through a selected one of the thermal elements $R_3$-$R_N$ in FIG. 9B, and its associated one of the driver transistors $Q_1$-$Q_N$ to ground. Any given one of the thermal resistive elements $R_3$-$R_N$ in FIG. 9B can be controllably selected by selectively enabling its associated one of the driver transistors $Q_3$-$Q_N$ in FIG. 9B.

For measurement purposes, only one of the thermal printhead elements $R_3$-$R_N$ in FIG. 9B is activated or turned on at any given time. This is accomplished by the processor 112 outputting serial data onto the SERIAL DATA line 94 and associated clock pulses onto the CLOCK line 90. The serial data contains only one "1" state bit which is associated in position within the serial data to the position of the element 72 in the printhead 70 that is to be measured, with the remaining N−1 bits in the serial data being "0" state bits.

The serial data containing only one "1" state bit is clocked from the line 94 into the shift register 86 by means of the clock pulses on line 90. The position of this "1" state bit in the serial data in register 86 corresponds to the position of the element in the printhead that is to be measured. This "1" state bit in the register 86 is latched into latch 84 by a LATCH pulse on line 88. That latched "1" state bit, which is now at an associated one of the outputs $L_3$-$L_N$ of latch 34 of FIG. 9B, is then used to enable the associated one of AND gates 80, at the time of a TBURN pulse from the interface circuitry 92, to activate the desired one of the elements $R_3$-$R_N$ in FIG. 9B by turning on the associated one of the transistors $Q_3$-$Q_N$ in FIG. 9B. For example, if element $R_3$ in FIG. 9B is to be measured, only the last bit clocked into the register 86 would be a "1" state bit. This "1" state bit would be applied via line $SR_3$ to latch 84 and latched therein by a LATCH pulse. This "1" state bit in latch 84 would be applied via line $L_3$ to enable the corresponding AND gate 80 at the time of the TBURN pulse to turn on transistor $Q_3$ and thereby activate element $R_3$ and thus allow its resistance to be measured upon application of the constant current.

Alternatively, it has been determined in practice that the TBURN line 82 may be left on for the entire printhead element resistance measurement period as the constant current flowing through the element is comparatively low, and the required system measurement time is small.

It will be recalled that, when diode 110 is forward biased, the 10 ma of constant current from the current regulator diodes 106 flows through the diode 110 and through the selected one of the thermal elements $R_3$-$R_N$ of FIG. 9B and its associated one of the driver transistors $Q_3$-$Q_N$ of FIG. 9B to ground. This 10 ma of constant current causes a voltage VSENSE to be developed at the junction 108 of the diode 110 and the parallel-connected diodes 106.

The amplitude of VSENSE is substantially dependent upon the amplitude of the voltage developed across the selected one of the elements $R_3$-$R_N$ of FIG. 9B, which in turn is dependent upon the resistance of the selected one of the elements $R_3$-$R_N$ of FIG. 9B. More specifically, the amplitude of VSENSE can be determined by the equation:

$$VSENSE = (0.01A) \cdot R_{TPH} + V_{D110} + V_{QTPH}$$

where
0.01A = 10 ma
$R_{TPH}$ = resistance of whichever thermal printhead element has been selected for measurement ($R_3$-$R_N$ of FIG. 9B)
$V_{D110}$ = voltage drop across the germanium diode 110 (typically 0.2 to 0.3V)
$V_{QTPH}$ = voltage drop across whichever saturated driver transistor is turned on by the "1" state bit (typically 0.8V).

Thus, a VSENSE value equaling voltage measured at input IN0 to the analog-to-digital converter 111 can be determined for each of the thermal elements $R_3$-$R_N$ of FIG. 9B in the thermal printhead 70. Each VSENSE value is sequentially digitized by the analog-to-digital converter 111, after which the processor 112 temporarily stores the digitized VSENSE value into one of the processor general purpose registers. The software program stored in read-only memory (ROM) 116 then directs the processor 112 to subtract the digitized equivalent of the sum of $V_{D110}$ and $V_{QTPH}$ to obtain the digitized equivalent of $(0.01A)(R_{TPH})$ measurement and thus obtain a value which effectively corresponds to the respective element resistance. These computed digitized values of $(0.01A)$ $(R_{TPH})$ for the printhead elements are then stored in RAM memory 114.

To obtain the absolute element resistance $R_{TPH}$ one would have to divide the $(0.01A)$ $R_{TPH}$ value by the constant 0.01A. In actual practice the linearly related term 0.01A $R_{TPH}$ is used and stored in RAM memory.

This sequence of measuring VSENSE for an element, subtracting the term $V_{D110}+V_{QTPH}$, and storing in RAM memory is repeated for all elements within the printhead.

There are at least two techniques to obtain the digitized value which represents the sum of $V_{D110}$ $V_{QTPH}$. The first, represented by FIG. 1 of previously-referenced U.S. application, Ser. No. 859,515 now U.S. Pat. No. 4,758,966, described therein, and not shown herein, involves assuming a constant non-varying voltage drop as a result of the constant 10 mA electrical current. For example $V_{D110}+V_{QTPH}=0.25$ V$+0.8$V$=1.05$ volts. This 1.05 volts may in turn be digitized by the analog-to-digital converter 111 during design and programmed as a fixed value into ROM 112. This approach is satisfactory for most applications. Furthermore a fixed constant value can also be assumed for VHEAD and programmed as a fixed value in ROM.

The second approach is illustrated in FIGS. 9A, 9B and may be utilized for applications where higher accuracy is desired. This second approach is in fact a preferred approach. As illustrated in FIGS. 9A, 9B, two of the printhead elements, say for example $R_1$ and $R_2$, have been made inoperative and their associated transistor drivers, $Q_1$ and $Q_2$, have been used to provide an automatic technique in determining a digitized value for the actual $(V_{D110}+V_{QTPH})$ value, and also a determination of the actual value of the regulated current. If transistors $Q_1$ and $Q_2$ are not selected for this technology, transistors $Q_{N-1}$ and $Q_N$, located at the opposite end of the printhead element line, should be selected, such that the printing operation need not be affected.

It is seen from FIGS. 9A, 9B that the collector 78 of transistor $Q_1$ is connected directly to the VHEAD line 98. It is noted that the collector 78 of transistor $Q_2$ is connected to one end of a precision ($\pm 0.1\%$) discrete resistor 72B of value RNOMINAL which equals the printhead manufacturer's specified nominal element average resistance. The other end of this precision discrete resistor 72B is connected to the VHEAD line 98. The precision discrete resistor 72B resides on the printhead proper 70 adjacent to the driver transistors. It is not located next to the elements $R_3$-$R_N$, nor does it play a role in the actual physical printing operation.

The operation of this second technique to obtain a digitized value for the sum of $V_{D110}+V_{QTPH}$ is quite simple.

First, only transistor $Q_1$ is selected by the methods previously described, producing a sense voltage VSENSE$_1=V_{D110}+V_{QTPH}$ which appears at the input IN0 to the analog-to-digital converter 111. With this technique, a measurement is provided of the actual diode and saturated transistor collector-emitter drops along with any connector interconnect voltage drops. These voltage drops may be approximated with one number, but in practice they will be dependent on the actual parts used and the actual usage configuration (setup and environment).

This VSENSE$_1$ is then digitized by the analog-to-digital converter 111 and stored in RAM 114 by the processor 112. Note that the VSENSE$_1$ value is comparatively insensitive to minor variations in the 10 mA constant current regulated by current regulator diodes 106.

Next, only transistor $Q_2$ is selected by the methods previously described producing a sense voltage, VSENSE $2=(I_{10mA})$ RNOMINAL$+V_{D110}+V_{QTPH}$ which appears at the input to the analog-to-digital converter 111. The sense voltage VSENSE$_2$ is digitized and stored in RAM 114 by the processor 112.

The processor 112 then subtracts the digitized value of VSENSE$_1$ from the digitized value of VSENSE$_2$. VSENSE$_2$−VSENSE$_1=[(I_{10mA})$ RNOMINAL$+V_{D110}+V_{QTPH}]-[V_{D110}+V_{QTPH}]=(I_{10mA})$ RNOMINAL.

Now since RNOMINAL is a precision (within plus or minus 0.1%) known resistance value, the voltage generated across it by a calibrated current of 10 mA can be determined and stored in ROM 116 at the time of software programming.

Since cost constraints prevent a calibrated current source from being used for current regulating diodes 106 in a production environment, use is made of inexpensive current regulating diodes such as are made by Motorola and others which are capable of regulating currents to plus or minus ten percent.

The purpose then of computing VSENSE$_2$−VSENSE$_1$ is to factor this plus or minus ten percent tolerance out of the equation.

The processor 112 computes a correction factor C by taking the ratio of the calibrated digitized value stored in ROM 116 to the actual measured value VSENSE$_2$−VSENSE$_1$ stored in RAM 114.

$$C = \frac{10\text{mA RNOMINAL}}{\text{VSENSE}_2 - \text{VSENSE}_1} = \frac{10\text{mA RNOMINAL}}{I_{10mA} \text{ RNOMINAL}}$$

$$= \frac{10\text{mA}}{I_{10mA}}$$

Thus, since $I_{10mA}$ can vary plus or minus 10%, the correction factor C will accommodate this variation. For example, if the actual value of $I_{10mA}$ is slightly lower than 10 mA, the measured value of VSENSE$_2$−VSENSE$_1$ might indicate a resistance lower than RNOMINAL. However, since RNOMINAL is known to within $\pm 0.1\%$ we can account for the lower current and provide the correct value of RNOMINAL by multiplying (VSENSE$_2$−VSENSE$_1$) by C.

This correction factor C will be used for each and every resistance measurement made within the printhead. Its purpose is to compensate for a regulated measurement current which differs from the nominal design value.

To summarize, the sequence for each printhead element resistance measurement cycle in FIGS. 9A, 9B is as follows:

A. CALIBRATION

1. Determine VSENSE$_1=V_{D110}+V_{QTPH}$
2. Determine the regulated measurement current calibration factor C.

B. MEASUREMENT OF ELEMENTS

3. Measure VSENSE for each of the elements
4. Subtract $VSENSE_1$ from VSENSE
5. Multiply the difference by the correction factor C to obtain the final measure of the element's resistance:

$$C[VSENSE - VSENSE_1].$$

Once again, it should be noted that the actual element resistance would be obtained by dividing the quantity C [VSENSE−VSENSE$_1$] by 10 mA. In practice, however, this is not necessary. It should also be noted that in practice the printhead element driver transistors $Q_1$-$Q_N$, the latches $L_1$-$L_N$ and the shift registers $SR_1$-$SR_N$ are contained in LSI integrated circuits in groups of 32 or 64; that is, 32 drivers, latches and shift registers all in one integrated circuit. As a result, in practice there is a characteristic $V_{QTPH}$ for each LSI integrated circuit. Therefore a more precise implementation would have one driver transistor from each LSI integrated circuit, similar to transistor $Q_1$ of FIG. 9B, dedicated for calibration purposes such that the value $V_{QTPH}$ for each integrated circuit can be determined. The result of the above is a table of digital values in the RAM memory 114 corresponding to each element resistance within the printhead.

Following the measure of each of the printhead elements the processor 112 applies an ON signal to the ON/OFF line 103 to turn on the voltage regulator 102 allowing the VHEAD voltage to appear at 76.

In addition to the previously-mentioned interface circuitry 92, parallel-to-serial shift register 96, analog-to-digital converter 111, processor 112 and random access memory (RAM) 114, the system for controlling the energization and operation of the thermal printhead 70 includes a read-only memory (ROM) 116 and data input means 118. The data input means 118 may take any desired or appropriate form, such as a communications interface with another system, for example, such as an interface with a video memory or the like. A digital data bus 120 couples these various components together, for purposes of communication and control. The digital data bus 120 actually comprises three separate buses, a data bus, an address bus and a control bus, which interconnect various components of the system.

To allow modulation of the individual printed dot, specific energies have to be assigned to each dot in the bit maps. Thus, the quarter stepping technique increases the requirements for the ROM memory 66 of FIG. 9A by a factor of 4 from the base line FIG. 2 representation, and use of the element energy modulation technique will result in a further factor of 4 increase in the ROM memory requirements, resulting in a 16-fold increase from the original base-lined FIG. 2. That is, each dot will be represented by 4-bit nibble that is one of sixteen possible energy levels, a range which has been found to be sufficient for most applications. In addition, RAM memory will be expanded by a maximum factor of 40 to accommodate the maximum number of basis burn time periods dt.

Figure 10:
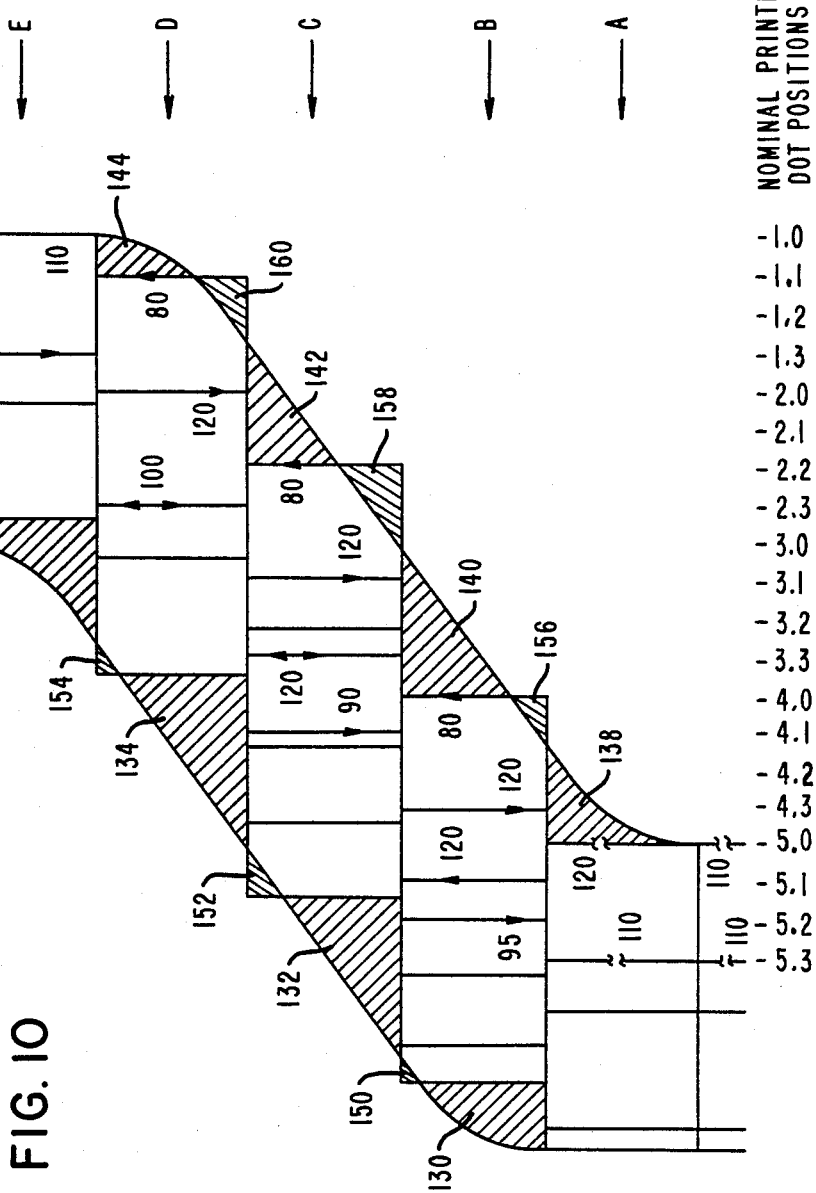
FIG. 10 is a diagram showing an enlargement of the diagonal cross part of the E13B character number seven printed using a serial thermal printhead, along with specific energy assigned to various portions of the character data.

With the capability of modulating printed dot size, the edge smoothness of the 65° diagonal line of the E13B number 7 diagonal crossbar during serial printing may be further improved, as shown in FIG. 10, which illustrates a closeup of the diagonal crossbar portion of the number 7, showing the nominal positions of the printed dots when the quarter dot stepping technique is utilized. The rectangular representation in FIG. 10 also quite clearly illustrates the problem with diagonals in excess of 33°; in this case 65°. The representation of the diagonal crossbar is staircase at best, even with quarter dot stepping. The shaded portions of FIG. 10 represent modifications of the rectangular representation, which can be made by varying the energy applied to a given printhead element of a given time. FIG. 10 assumes that the serial thermal printhead moves from the right to the left of the character. Also, in FIG. 10, is shown the of nominal energy which should be applied to each dot location to enhance the nominal quarter dot step representation of the diagonal line. In tabular form, this is summarized as follows, with the various incremental areas to be increased or decreased being represented by reference characters.

| DOT | % NOMINAL ENERGY | PROBLEM AREA |
| --- | --- | --- |
| A.5.0 | 120 | Enlarge into area 138 |
| A.5.3 | 110 | Enlarge into area 130 |
| B.4.0 | 80 | Decrease area 156 |
| B.4.3 | 120 | Enlarge into area 138 and 132 |
| B.5.1 | 120 | Enlarge into area 132 |
| B.5.2 | 95 | Decrease area 150 |
| C.2.2 | 80 | Decrease area 158 |
| C.3.1 | 120 | Enlarge into area 140 and 134 |
| C.3.3 | 120 | Enlarge into area 134 |
| C.4.1 | 90 | Decrease area 152 |
| D.1.1 | 80 | Decrease area 160 |
| D.2.0 | 120 | Enlarge into area 142 |
| E.1.0 | 110 | Enlarge into area 144 |
| E.1.3 | 110 | Enlarge into area 136 |

The foregoing methodology can produce a number seven in E13B font which is similar in appearance to the diagram of FIG. 11.

Figure 12:
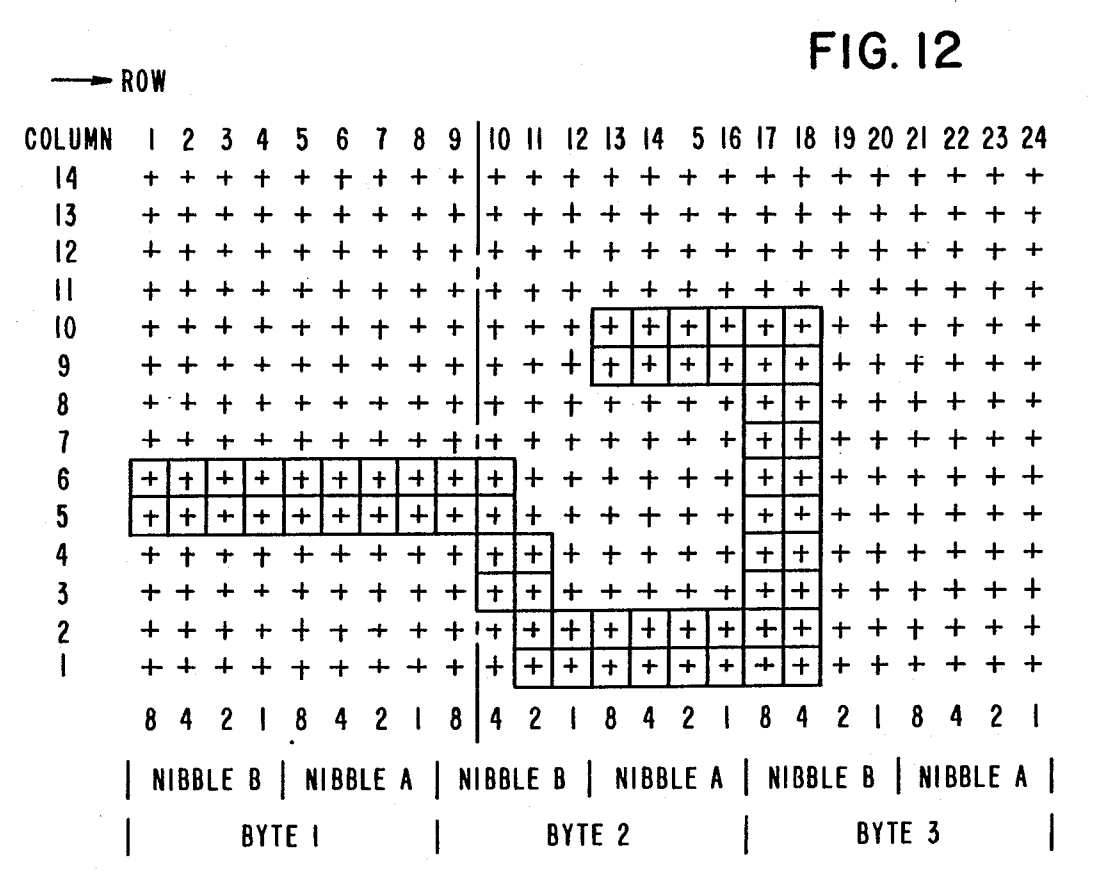

FIG. 12 shows the manner in which the data is arranged for the serial thermal printhead for the simplified fourteen by eighteen dot representation of the E13B number seven. It should be noted three 8-bit bytes are used to represent each column of the character. Nibble A of Byte three is not used for the E13B font, but can be used for fonts such as OCR, whose print center line is located higher from the bottom of the document than E13B, and for dot shifting techniques such as are described in U.S. Pat. No. 4,625,216.

FIG. 13 illustrates the manner in which the E13B number seven is stored in ROM memory for the base line fourteen by eighteen dot representation for serial printing when quarter dot stepping and element energy modulation are not used. Both binary and hexadecimal representation are illustrated in FIG. 13. It should be noted that 42 bytes are required to represent the E13B character number seven.

Figure 14B:
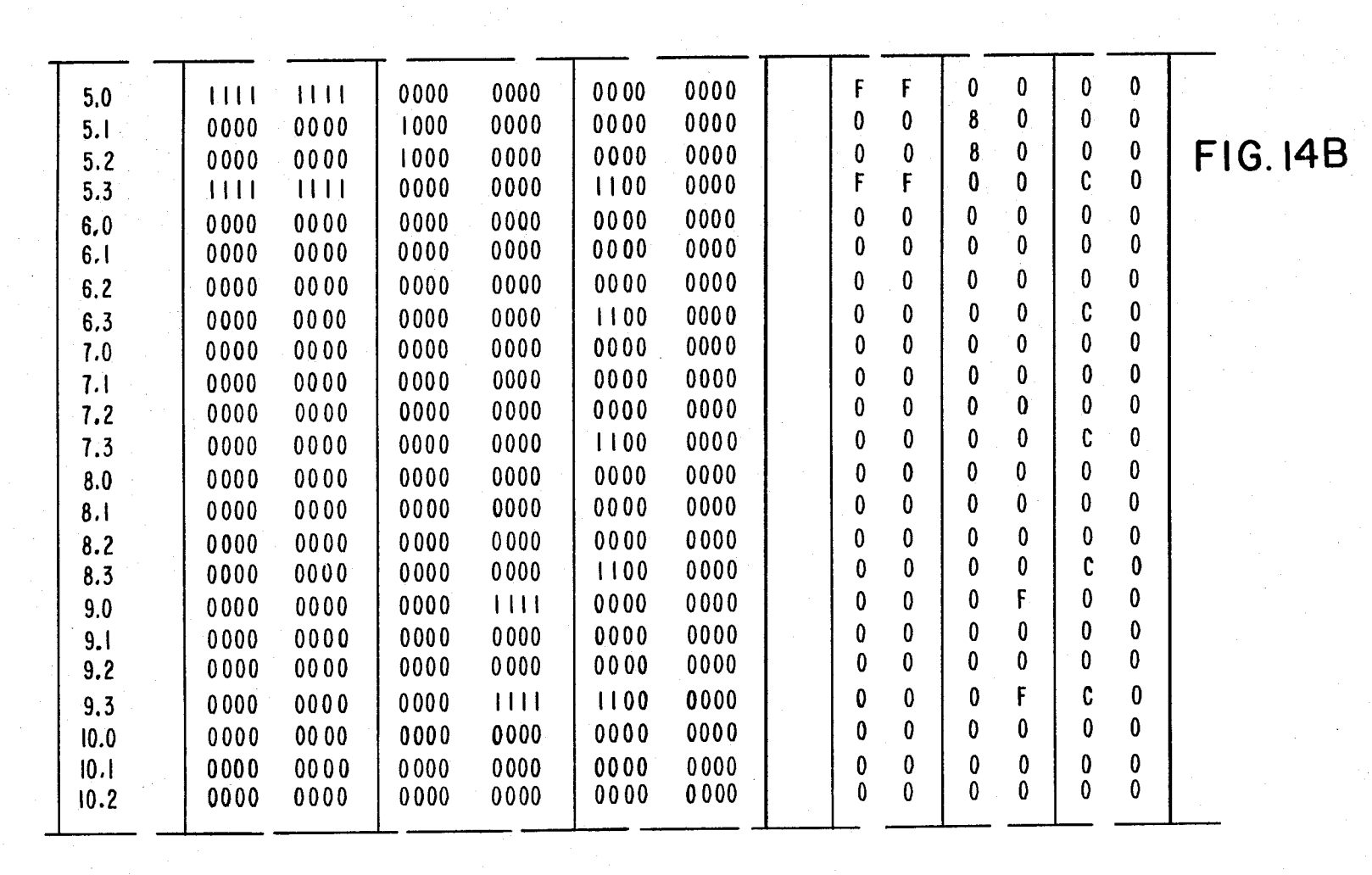
Figure 14C:
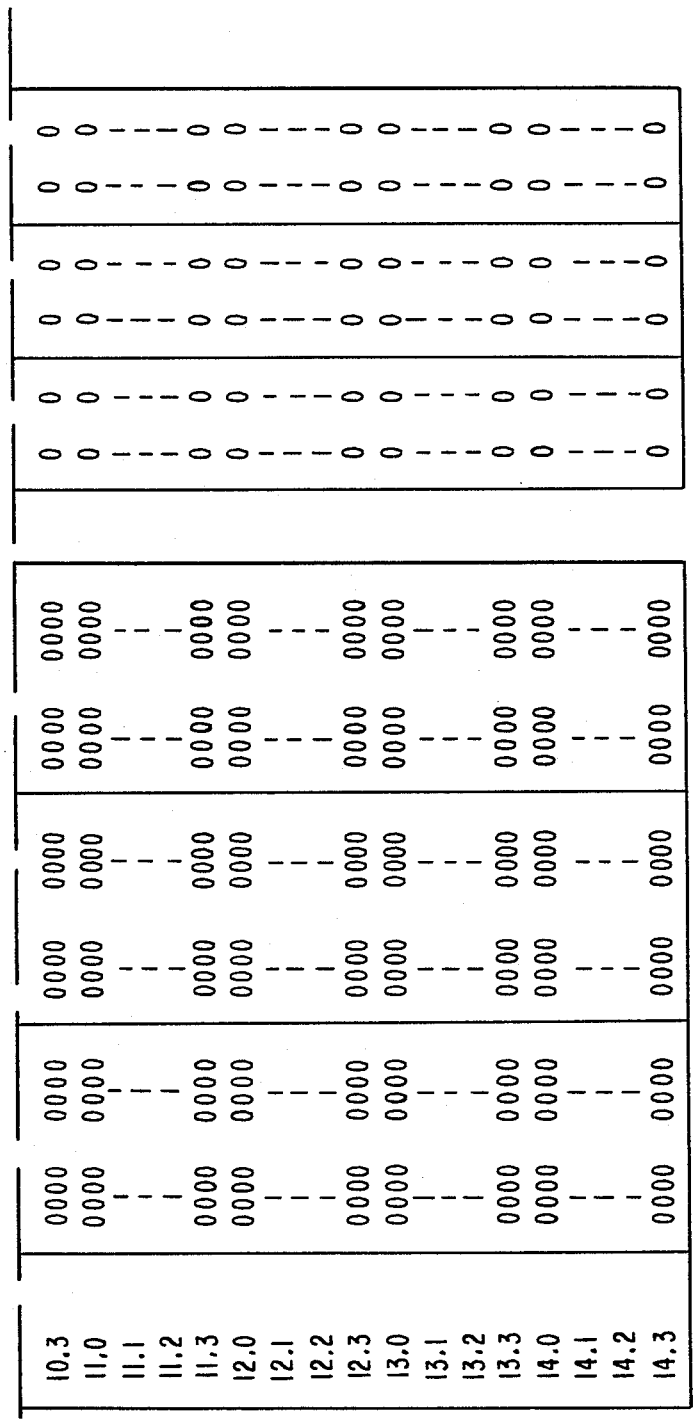

FIGS. 14A, 14B and 14C illustrate the ROM memory configuration for the E13B character number seven for serial printing when quarter dot stepping is used. Both binary and hexadecimal notation are used. It should be noted that 168 bytes of memory are required to represent the E13B character number seven.

FIGS. 15A and 15B illustrate the ROM memory configuration for the E13B character number seven for serial printing when both quarter dot stepping and element energy modulation are used. Only hexadecimal notation is used in FIGS. 15A and 15B. It should be noted that 672 bytes of memory are used to represent E13B character number 7. In a minimally configured system, it is possible to "drop" rows 19-24 inclusive, reducing the memory requirements to 504 bytes for the E13B character number seven and other characters in the font.

It should be noted that a key difference between FIGS. 15A and 15B and either FIG. 13A or FIGS. 14A, 14B and 14C is that FIG. 13 and FIGS. 14A, 14B and 14C assign a nibble (4 bits) to each dot position. This nibble determines the energy level required at a specific dot position. FIG. 16 illustrates the relationship between the percent of nominal energy (as illustrated in FIG. 10) and the hexadecimal notation used in FIGS. 15A and 15B for each dot position. The basic operation is that the hexadecimal notation is retrieved from the ROM character memory and the hexadecimal code is translated via a look-up table, which is also in ROM memory, to give the required element energy as per FIG. 16.

Referring to FIG. 9 and to the flow diagrams of FIGS. 17, 18A, 18B, 18C and 19, the basic operation of the system will now be described.

Figure 17:
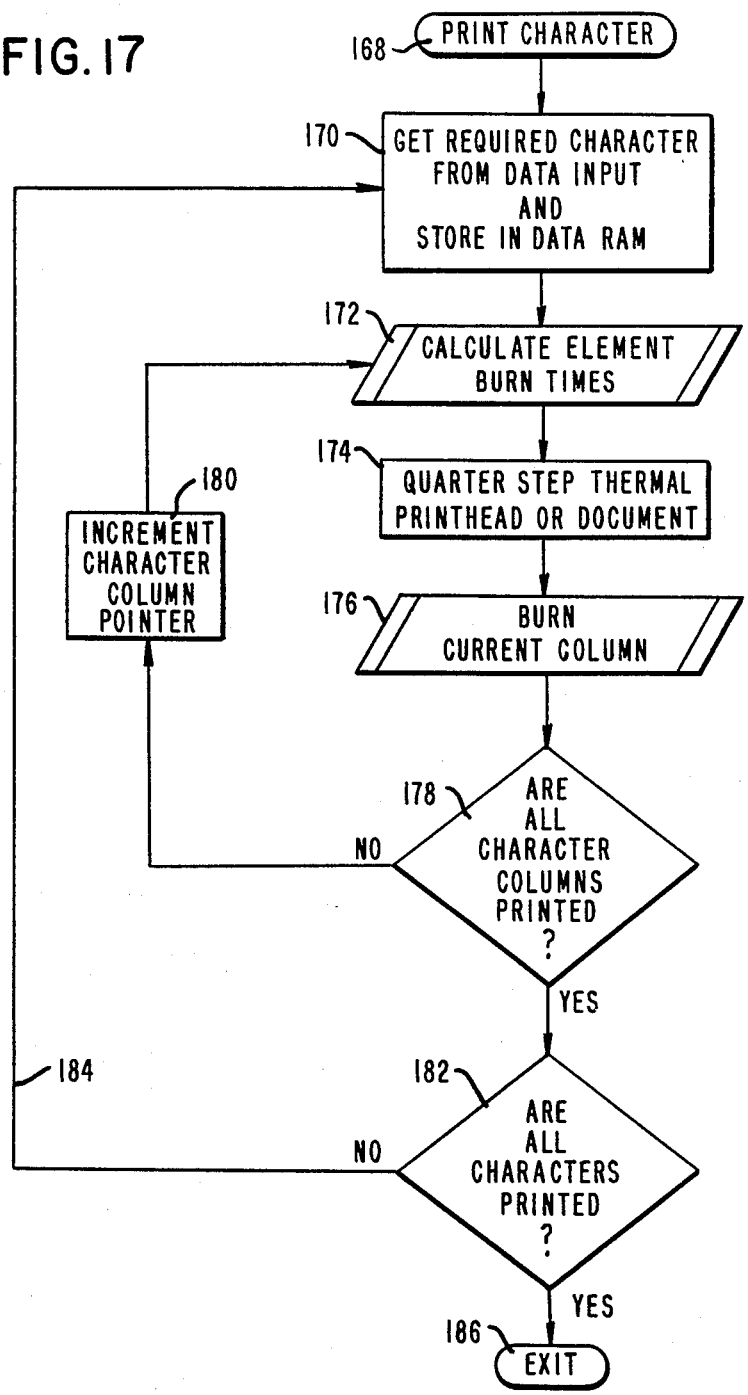
FIG. 17 is a flow diagram showing the main line software operation employed in a serial thermal printing operation.

FIG. 17 shows the main line routine for a serial printing operation while FIGS. 18A, 18B, 18C and 19 are subroutine flow diagrams which may be called up by the main line routine of FIG. 17. Although the routine shown in FIG. 17, and the subroutines shown in FIGS. 18A, 18B, 18C and FIG. 19 are directed to a serial operation of a printhead, they could readily be adapted to parallel printhead operation.

Referring now to FIG. 17, the print character main line routine is shown there, commencing with print character block 168. In block 170, the required character data input is obtained from the data input module 118 of FIG. 9A, and is stored in RAM 114. The subroutine "calculate element burn times" shown in block 172 is described more fully in FIGS. 18A, 18B and 18C. This subroutine is performed to calculate the thermal printhead burn times and the burn increment counts for each of the twenty-four elements (row elements) in the printhead. The thermal printhead or the document is then stepped in a quarter step mode to either move it into position or to advance it to the next column print position, as represented in block 174. As represented in block 176, the subroutine burn current column, the character column data is transferred by direct memory access from the RAM 114 to the parallel-to-serial shift register 96, and is then serially clocked into the thermal printhead shift register 86. This data is then latched into latch 84 to initiate the energization of the selected thermal printhead elements. The shift register 86 and the latch 84 are continually updated at repetition times given by the following expression in which dt represents maximum update time.

$$dt = \frac{\text{Number TPH Elements}}{\text{Serial Clock Frequency}} = \frac{24}{4.5 \text{ MHz}} = 5.5 \text{ microseconds}$$

For this application, updating is performed every 80 microseconds since finer resolution is not required. This update continues until a maximum burn time is reached, whereupon the TBURN line 82 is turned off. The result is customized burn times, and thus customized energies, for each element within the printhead. These customized energies result in controlled print dot sizes.

In block 178, a query is made to determine whether or not all character columns have been printed. In the illustrated example, sixty-four columns will be printed for each character. If the answer to this query is no, the character column pointer is incremented in block 180 and the process is reentered at block 172. If the answer to the query is yes, the query is made at block 182 as to whether all the characters have been printed. If the answer is no, the next character is obtained from the data input 118, by return to block 170 over path 184. If the answer is yes, the main line routine is exited at block 186, waiting for the next data input.

Figure 18A:
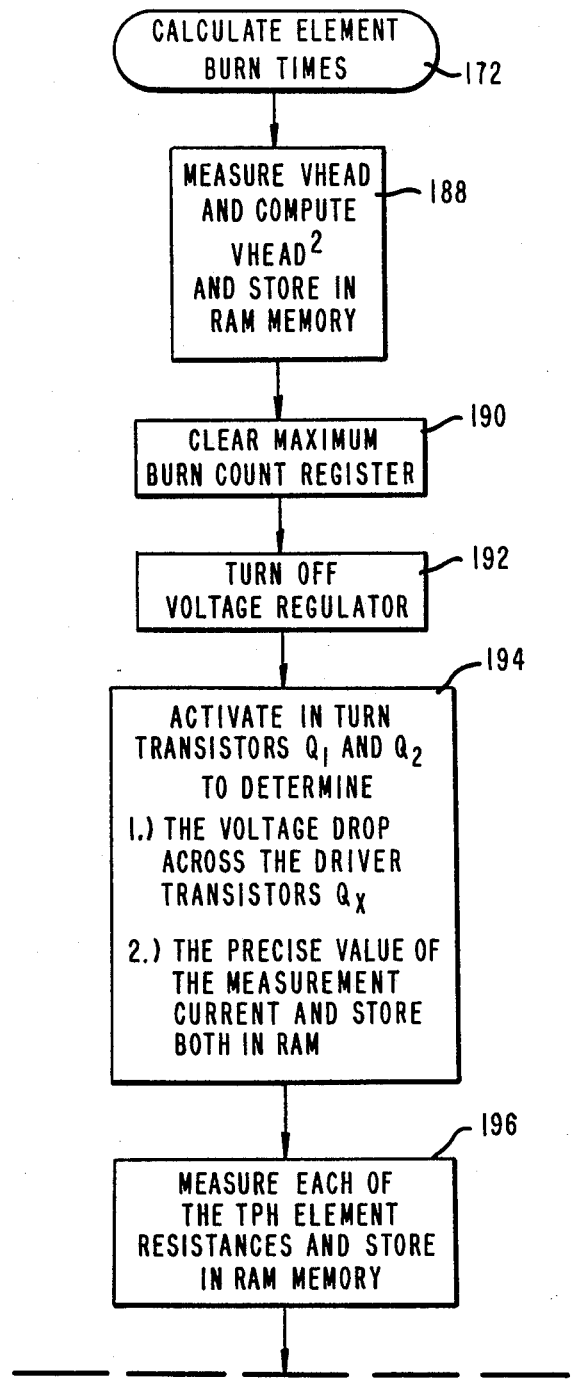
FIGS. 18A, 18B and 18C, taken together, constitute a flow diagram illustrating the software subroutine for calculating element burn times employed in the diagram of FIG. 17.
Figure 18B:
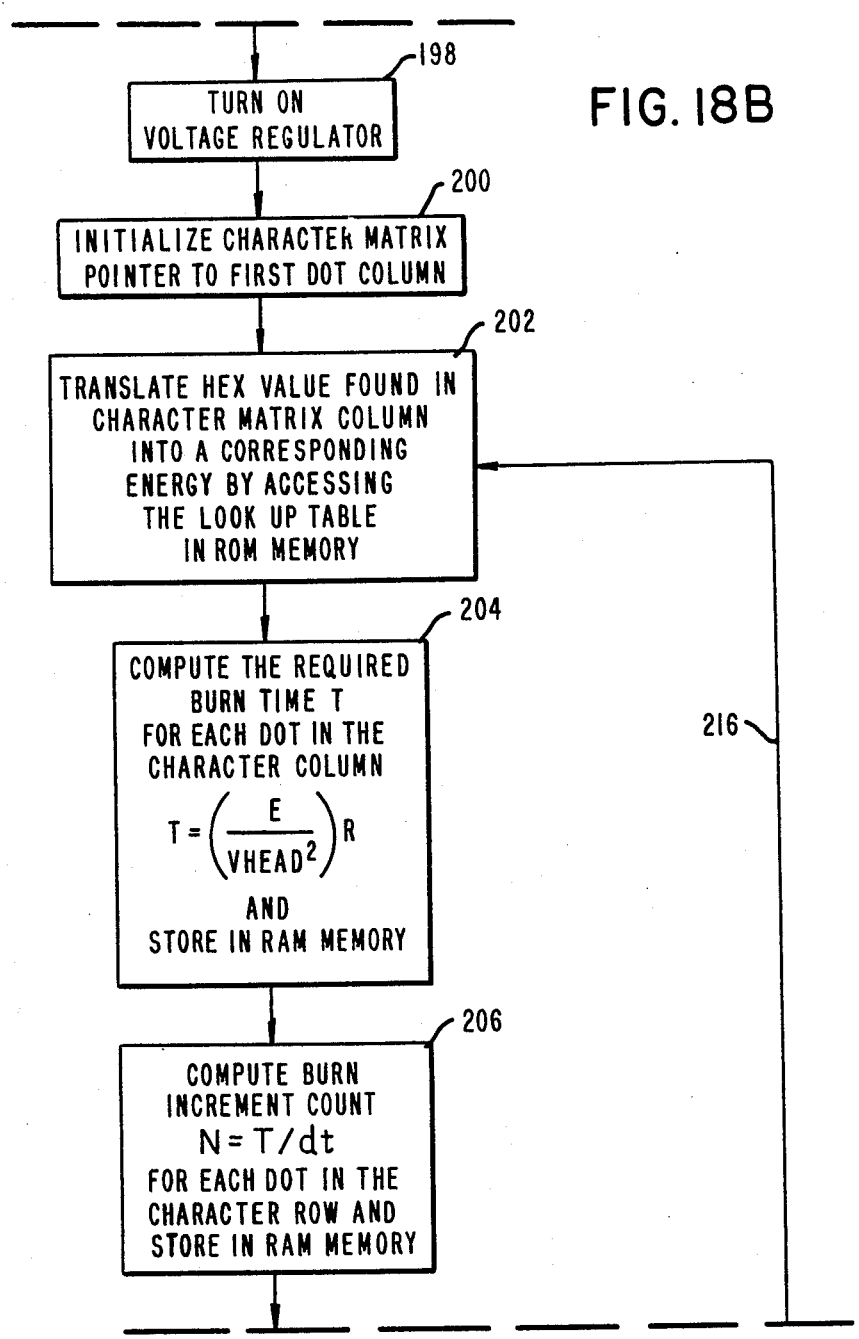
Figure 18C:
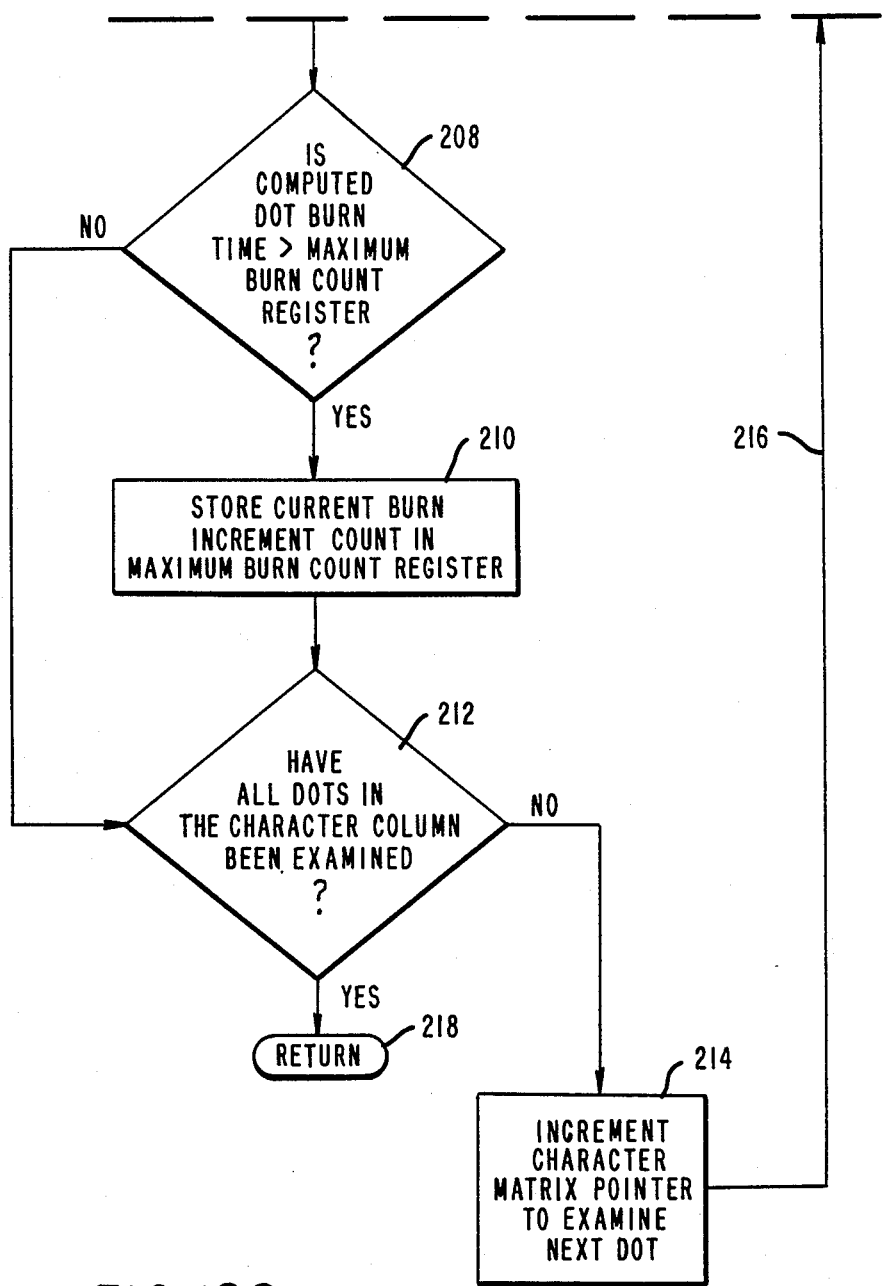
Figure 20:
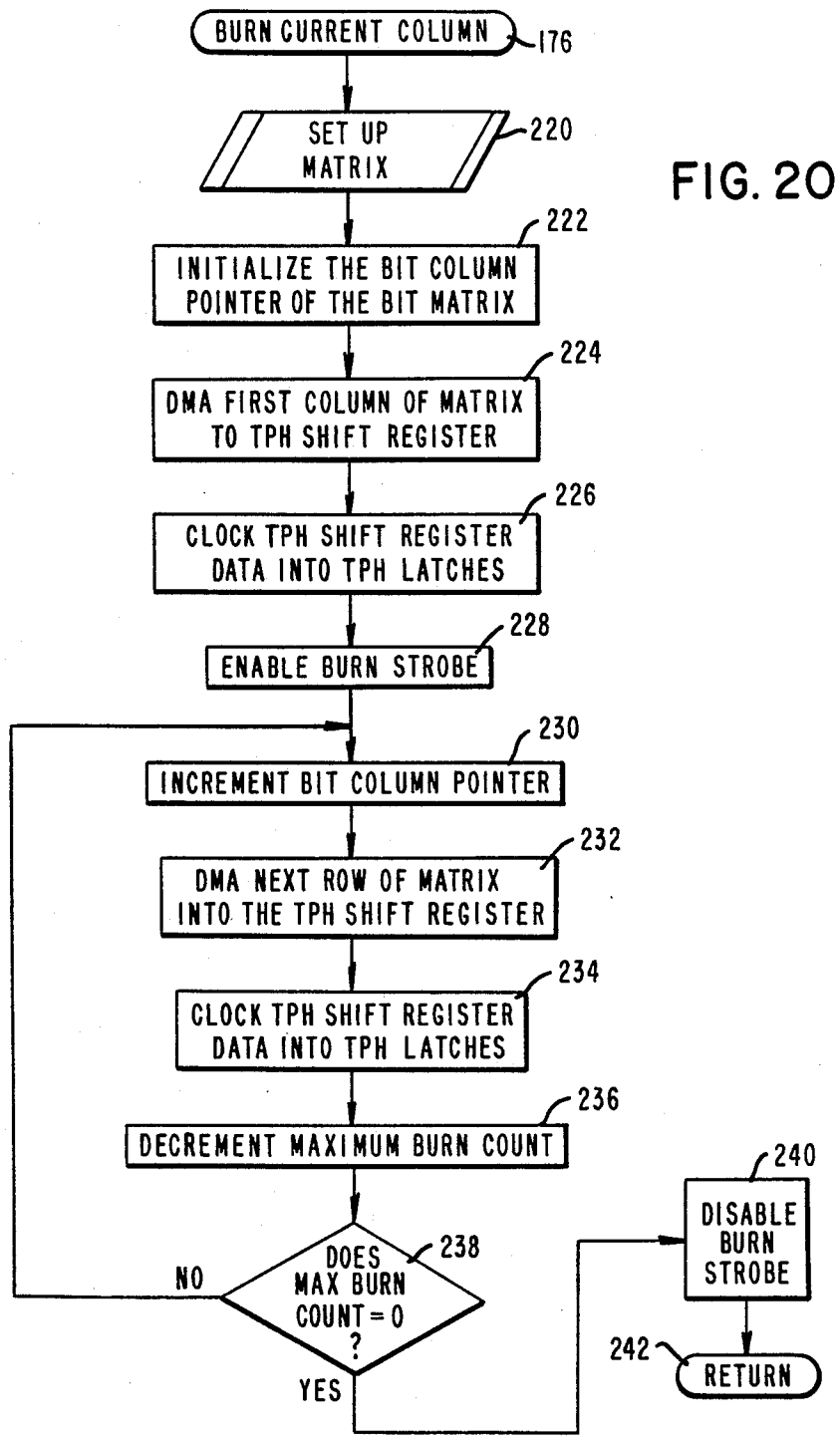
FIG. 20 is a flow diagram illustrating the software subroutine for setup burn matrix employed in the diagram of FIG. 17.

Turning now to FIGS. 18A, 18B and 18C, in the subroutine "calculate element burn times", commencing with block 172, which was briefly explained in the description of the main line routine, the following operation takes place.

First, the voltage which is applied to the thermal printhead, VHEAD, is measured and digitized by the analog-to-digital converter 111 of FIG. 9A. This value is then squared and stored in the RAM 111, as represented in block 188, at address 11H of FIG. 21. The maximum burn count register (address 10H of FIG. 21), which will determine the longest burn time to be applied to one of the elements in the thermal printhead, is cleared or zeroed as represented in block 190. At block 192, the voltage regulator 102 is turned off. At block 194, the thermal printhead transistor $Q_1$ is selected to determine the saturation voltage drop of the thermal printhead element driver transistors 78. This voltage, which is developed in response to the regulated constant current controlled by current regulator diode 106, is digitized by the analog-to-digital converter 111 and is stored in the RAM 114 at address 12H of FIG. 21. Also, in block 194, the thermal printhead transistor $Q_2$ is selected to allow determination of the precise constant measuring current by passing the current through a 0.1% precision resistor RNOMINAL and measuring the voltage developed across said resistor after the previously determined transistor saturation voltage is subtracted. This "actual" constant current value is determined by comparing this measured voltage to the "ideal" voltage developed across the resistor RNOMINAL if an "ideal" constant current is passed through it. This actual current is then stored in the RAM 114 (address 13H of FIG. 21).

At block 196, each of the thermal printhead element resistances is measured by selecting one of the thermal printhead transistors $Q_3$-$Q_n$ at a time, and passing the known constant current determined in block 194 through the unknown thermal printhead resistance $R_3$-$R_n$. This voltage is then digitized and divided by the previously stored constant current value to give the element resistance. In the illustrated embodiment, twenty-four thermal printhead element resistances $R_3$-$R_{26}$ are determined and stored in the RAM 114, in addresses 14H-28H of FIG. 21. At block 198 (FIG. 18B), the voltage regulator 102 is switched back on.

At block 200, the character (energy) byte map pointer is initialized to the first dot column of the character being printed in the ROM 116. All characters are contained within 1010H to 5990H of FIG. 22. The specific starting address depends upon the character being printed. The energy required for each dot is represented in the ROM 116 by a 4-bit nibble, as per FIG. 14. This hexadecimal representation in the character ROM is then translated via a look-up table into a corresponding energy, as represented in block 202. In block 204, the burn time T for the considered dot element in the column is determined by dividing the required energy by the previously stored VHEAD$^2$, and multiplying this result by the measured resistance. This result is then stored in the RAM 114, in addresses 14H-28H of FIG.

21. This "analog" burn time is then converted into "discrete" burn increment counts, as represented in block 206, by dividing the computed burn time T by a basis time interval dt, which for the example is 0.080 milliseconds. Thus, for example, if there is a calculated burn time of 1.60 milliseconds, a burn increment count of 1.60 divided by 0.80, which equals 20, would be obtained. This computed burn increment count is then stored in RAM 114 at address 14H–28H of FIG. 21. This count will determine the number of times the thermal printhead element is updated to obtain the desired energy and hus the desired dot size. In block 208 (FIG. 18C), this computed burn increment count is compared to a maximum burn count register to determine whether or not it exceeds the maximum burn count. If the answer is yes, the maximum burn count register is replaced by the burn increment count, as shown in block 210. Following this, or if the answer in block 208 is no, the query is made in block 212 as to whether or not all of the dots in the character column have been examined. If the answer is no, the character matrix pointer is advanced to the next dot (row), as represented in block 214, and the process is reentered via a path 216 at block 202. If the answer is yes, the subroutine is terminated, as shown in block 218 and the flow reverts to the main line routine.

Figure 19:
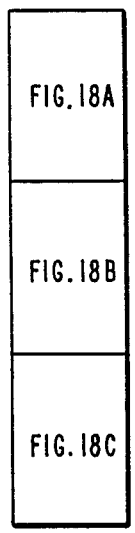

Turning now to FIG. 19, the subroutine 176 "burn current column", represented in block 176, which was briefly described for the main line routine, is shown. As represented in block 220, the set up burn matrix operation is called. This block examines the burn increment counts assigned to each element in the thermal printhead and sets up a corresponding binary bit column, which is 24 bits long, and which indicates, for each of the basis times increments dt contained in the maximum burn count register, whether a specified dot will be on or off. This bit matrix is stored in the RAM 114, contained within an address range of 2CH–AH4 in FIG. 21. The final address depends upon the maximum burn count register. For example, if column 1 of the exemplary E13B character seven is examined, it is seen that of the 24 rows, only rows 12–18 will be energized.

Let it be supposed that the burn increment counts for these seven rows are 23, 18, 21, 20, 21, 19 and 20, respectively. The maximum burn increment count is obviously 23. Thus, after the activity in block 220 is completed, a 24 dot wide by 23 dot deep bit matrix will be stored in RAM which, when transferred 24 bits at a time to the thermal printhead, will control the thermal printhead operation. The RAM address will be 2C–71H of FIG. 21.

As represented in block 222, the first column of this bit matrix is addressed. As represented in block 224, this column of 24 bits is transferred by direct memory access from the RAM 114 to the parallel-to-serial shift register 96 and onto the thermal printhead shift register 86 via clock 90 (block 226) at a 4.5 MHz rate. As shown in block 228, the TBURN line is enabled. While the first basis burn of 0.080 milliseconds is progressing, as represented in block 30, the next column of the bit matrix is addressed.

As represented in block 232, this bit matrix is transferred by direct memory access from the RAM 14 to the parallel-to-serial shift register 96, and is then clocked onto the thermal printhead shift register 86. As represented in block 234, at the conclusion of the previous serial 0.080 millisecond basis time, the data is latched from the thermal printhead shift register 86 to the thermal printhead latches 84. As represented in block 236, the maximum burn count register is decremented. As represented in block 238, this register is interrogated to see whether or not it is zero. If the answer is no, the process is reentered as represented in block 230. If the answer is yes, the TBURN line 82 is turned off, as represented in block 240. The subroutine is then completed and the flow is returned (block 242) to the main line routine to be ready for the next dot column.

Although the diagonal crossbar of the E13B character number seven has been used herein as an example, the techniques described are not limited to this use. The blended radii of curvature of the E13B character zero may also be realized with these techniques, as can characters of other financial fonts, such as OCR and CMC7. Furthermore, algorithms can be derived for the more general graphics problems of diagonal lines and radii of curvature.

The parallel thermal printhead approach described herein may be particularly suited for applications such as are described in U.S. Pat. Nos. 4,394,092 and 4,531,132, and as are described in U.S. patent applications, Ser. No. 561,449 and 786,887 now U.S. Pat. No. 4,731,524, issued Mar. 15, 1988). The serial thermal printhead approach may be particularly suited for use in inexpensive "table top" MICR or OCR encoders in an item processing or retail environment. A hybrid approach would be to use a parallel "line" thermal printhead in a serial mode, with some thermal printhead elements used to print the MICR/OCR line and with other elements being used to print the date, courtesy amount, legal amount, payee name, bar code, other symbol or design, etc. This hybrid approach could find wide use in a retail environment, as a general check printer, using for example the apparatus illustrated in FIG. 4, in which the device embodying this approach would take a blank piece of paper and generate a completed check.

While the forms of the invention shown and described herein are admirably adapted to fulfill the objects primarily stated, it is to be understood that it is not intended to confine the invention to the forms or embodiments disclosed herein, for it is susceptible of embodiment in various other forms within the scope of the appended claims.

What is claimed is:

1. A method for thermal printing of characters having diagonal or curved portions, comprising the following steps:
    stepping a thermal printhead having a plurality of individual printhead elements with respect to a record member to be printed upon, taking incremental overlapping steps which are in length a fraction of the length of the printhead elements to minimize voids and staircase corners which would otherwise occur when a diagonal or curved line is printed with said print elements; and
    applying varying amounts of energy to each print element as appropriate during each incremental overlapping step to enlarge or reduce the area of the element impression on the record member to further aid in minimizing the occurrence of voids and staircase corners during printing of a diagonal or curved line.

2. The method of claim 1 in which each incremental step is approximately one-fourth of the length of a individual thermal print element.

3. The method of claim 1 in which the amount of energy applied to a thermal printhead element may vary from 80% to 120% of a nominal energy value.

4. The method of claim 1 in which said characters are printed in a parallel mode.

5. The method of claim 1 in which said characters are printed in a serial mode.

6. The method of claim 1 in which some elements of the thermal printhead are dedicated to a character font and other elements are utilized for other printing.

7. The method of claim 6 in which the method is used to print a check.

8. A method for controlling a thermal printing operation employing a thermal printer having a plurality of print elements for printing characters having diagonal or curved portions, comprising the following steps:
selecting print elements for printing portions of a character on a step-by-step basis with each step being a fraction less than one of the length of a print element, each selected print element being selected for repeated printing with a minimum overlap to form horizontal and vertical character lines, and being selected to minimize the printing of voids and corners when printing a diagonal or curved line;
selecting a energy level for each energization of a print element, to selectively enlarge or reduce the area of the element impression, so as to further minimize the printing of voids and corners when printing a diagonal or curved line;
providing a digital value for each print element during each step, representing whether or not said element is to be energized, and if so, the amount of such energization, based upon the print selection and energy levels selection steps; and
storing said digital values in a memory from which they may be retrieved during a printing operation to control the energization of said print elements.

9. The method of claim 8 in which each step is approximately one-fourth the length of a print element.

10. The method of claim 8 in which the amount of energy applied to a print element may vary from 80% to 120% of a nominal energy value.

11. The method of claim 8 in which said characters are printed in a parallel mode.

12. The method of claim 8 in which said characters are printed in a serial mode.

13. The method of claim 8 in which some elements of the thermal printhead are dedicated to a character font and other elements are utilized for other printing.

14. The method of claim 13 in which the method is used to print a check.

15. Apparatus for printing characters having diagonal or curved portions on a record medium comprising:
a thermal printhead having a plurality of thermal printing character elements;
means for selecting print elements for printing portions of a character on a step-by-step basis, each selected print element being selected for repeated printing with a minimum overlap to form horizontal and vertical character lines, and being selected to minimize the printing of voids and corners when printing a diagonal or curved line;
means for providing relative incremental step movements between the printhead and the record medium;
means for selecting an energy level for each energization of a print element, to selectively enlarge or reduce the area of the element impression, so as to further minimize the printing of voids and corners when printing a diagonal or curved line;
means for storing a digital value for each print element during each step, representing whether or not said element is to be energized, and if so, the amount of such energization, based upon the print selection and energy level selection; and
means for retrieving said digital values during a printing operation and controlling said selecting means in accordance with said digital values to control the energization of said print elements.

16. The apparatus of claim 15 in which each incremental step is approximately one-fourth of the length of an individual thermal printing character element.

17. The apparatus of claim 15 in which the amount of energy which may be applied to a thermal printing character element may vary from 80% to 120% of a nominal energy value.

18. The apparatus of claim 15 in which said characters are printed in a parallel mode.

19. The apparatus of claim 15 in which said characters are printed in a serial mode.

20. The apparatus of claim 15 in which the means for providing relative incremental step movements moves the thermal printhead incrementally with respect to the record medium.

21. The apparatus of claim 15 in which some elements of the thermal printhead are dedicated to a character font and other elements are utilized for other printing.

22. The apparatus of claim 21 in which said apparatus is used to print a check.

* * * * *